US010233827B2

(12) United States Patent
Hahn et al.

(10) Patent No.: US 10,233,827 B2
(45) Date of Patent: Mar. 19, 2019

(54) TURBINE WASTEGATE

(71) Applicant: Garrett Transportation I Inc., Torrance, CA (US)

(72) Inventors: Stanislav Hahn, Brno (CZ); Petr Cizek, Brno (CZ); Antonin Forbelsky, Brno (CZ); Filip Tomanec, Brno (CZ)

(73) Assignee: Garrett Transportation I Inc., Torrance, CA (US)

(*) Notice: Subject to any disclaimer, the term of this patent is extended or adjusted under 35 U.S.C. 154(b) by 129 days.

(21) Appl. No.: 15/218,045

(22) Filed: Jul. 24, 2016

(65) Prior Publication Data

US 2018/0023462 A1    Jan. 25, 2018

(51) Int. Cl.
| F02D 23/00 | (2006.01) |
| F02B 37/18 | (2006.01) |
| F16K 1/20 | (2006.01) |
| F16K 31/52 | (2006.01) |
| F16C 33/08 | (2006.01) |

(52) U.S. Cl.
CPC .......... *F02B 37/186* (2013.01); *F02B 37/183* (2013.01); *F16K 1/2007* (2013.01); *F16K 31/521* (2013.01); *F16C 33/08* (2013.01); *F16C 2226/36* (2013.01); *F16C 2360/23* (2013.01)

(58) Field of Classification Search
CPC ...... F02B 37/186; F02B 37/18; F16K 1/2007; F16K 31/521
USPC ............................................ 60/602; 415/144
See application file for complete search history.

(56) References Cited

U.S. PATENT DOCUMENTS

| 7,644,583 | B2* | 1/2010 | Leavesley | ............... F02B 37/18 60/602 |
| 2013/0287552 | A1 | 10/2013 | House et al. | |
| 2014/0072412 | A1* | 3/2014 | Marques | ............... F02B 37/183 415/144 |

FOREIGN PATENT DOCUMENTS

| EP | 2 253 816 A1 | 11/2010 | |
| EP | 2574754 A2 * | 4/2013 | ............ F02B 37/186 |
| EP | 2 693 016 A2 | 2/2014 | |
| EP | 2 708 715 A2 | 3/2014 | |
| JP | H05 248253 A | 9/1993 | |
| WO | 2013/048687 A1 | 4/2013 | |

(Continued)

OTHER PUBLICATIONS

English machine translation of Spreidler et al. (Pub. No. EP 2 253 816 A1), published on Nov. 24, 2010.*

(Continued)

*Primary Examiner* — Thai Ba Trieu
(74) *Attorney, Agent, or Firm* — Brian J. Pangrle

(57) ABSTRACT

A turbine housing assembly can include a turbine housing that includes an exterior surface, an interior surface that includes a wastegate seat, and a bore that extends between the interior surface and the exterior surface; a bushing disposed at least partially in the bore where the bushing includes a bushing bore; a wastegate that includes a shaft that extends through the bushing bore to a shaft end, a shaft shoulder disposed in the bushing bore, a plug, and an arm disposed between the shaft and the plug; a ring disposed at least in part in the bushing bore between the shaft shoulder and the shaft end; and a control arm connected to the shaft proximate to the shaft end to define an axial distance between a surface of the control arm and the shaft shoulder where the ring has an axial length that is less than the axial distance.

18 Claims, 26 Drawing Sheets

(56) References Cited

FOREIGN PATENT DOCUMENTS

WO 2013/173055 A1 11/2013
WO 2015/171541 A1 11/2015

OTHER PUBLICATIONS

English machine translation of Takabe Kaoru (Pub. No. JP 05-248253 A), published on Sep. 24, 1993.*
Extended European search report, EP Application No. 17180148.3-1616, dated Oct. 27, 2017.
Extended European search report, EP Application No. 17180151.7-1616, dated Oct. 27, 2017.

* cited by examiner

Example: 1200
Figs. 12, 13, 14

Example: 1500
Figs. 15, 16, 17
(e.g., shim)

Example: 1800
Figs. 18, 19, 20, 21
(e.g., ring)

Example: 2200
Figs. 22, 23, 24, 25
(e.g., shim and ring)

Fig. 11

TURBINE WASTEGATE

TECHNICAL FIELD

Subject matter disclosed herein relates generally to turbomachinery for internal combustion engines and, in particular, to turbine wastegates.

BACKGROUND

A turbine wastegate is typically a valve that can be controlled to selectively allow at least some exhaust to bypass a turbine. Where an exhaust turbine drives a compressor for boosting inlet pressure to an internal combustion engine (e.g., as in a turbocharger), a wastegate provides a means to control the boost pressure.

A so-called internal wastegate is integrated at least partially into a turbine housing. An internal wastegate typically includes a flapper valve (e.g., a plug), a crank arm, a shaft or rod, and an actuator. A plug of a wastegate often includes a flat disk shaped surface that seats against a flat seat (e.g., a valve seat or wastegate seat) disposed about an exhaust bypass opening, though various plugs may include a protruding portion that extends into an exhaust bypass opening (e.g., past a plane of a wastegate seat).

In a closed position, a wastegate plug should be seated against a wastegate seat (e.g., seating surface) with sufficient force to effectively seal an exhaust bypass opening (e.g., to prevent leaking of exhaust from a high pressure exhaust supply to a lower pressure region). Often, an internal wastegate is configured to transmit force from an arm to a plug (e.g., as two separate, yet connected components). During engine operation, load requirements for a wastegate vary with pressure differential. High load requirements can generate high mechanical stresses in a wastegate's kinematics components, a fact which has led in some instances to significantly oversized component design to meet reliability levels (e.g., as demanded by engine manufacturers). Reliability of wastegate components for gasoline engine applications is particularly important where operational temperatures and exhaust pulsation levels can be quite high.

Various examples of wastegates, wastegate components and wastegate related processes are described herein.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where:

FIG. 11 is a block diagram of various blocks corresponding to examples of assemblies;

DETAILED DESCRIPTION

Figure 1:
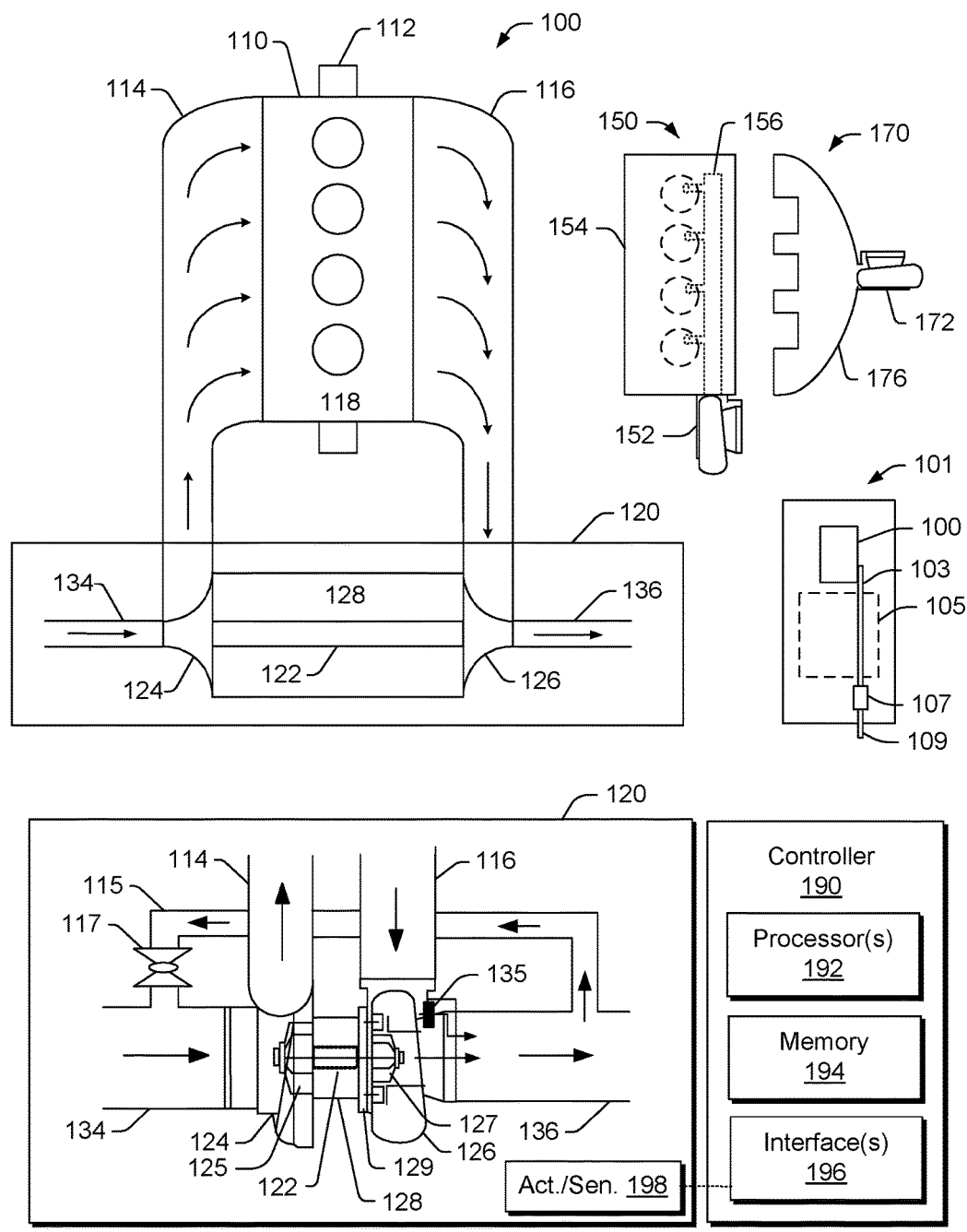
FIG. 1 is a diagram of a turbocharger and an internal combustion engine along with a controller and an example of a vehicle.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
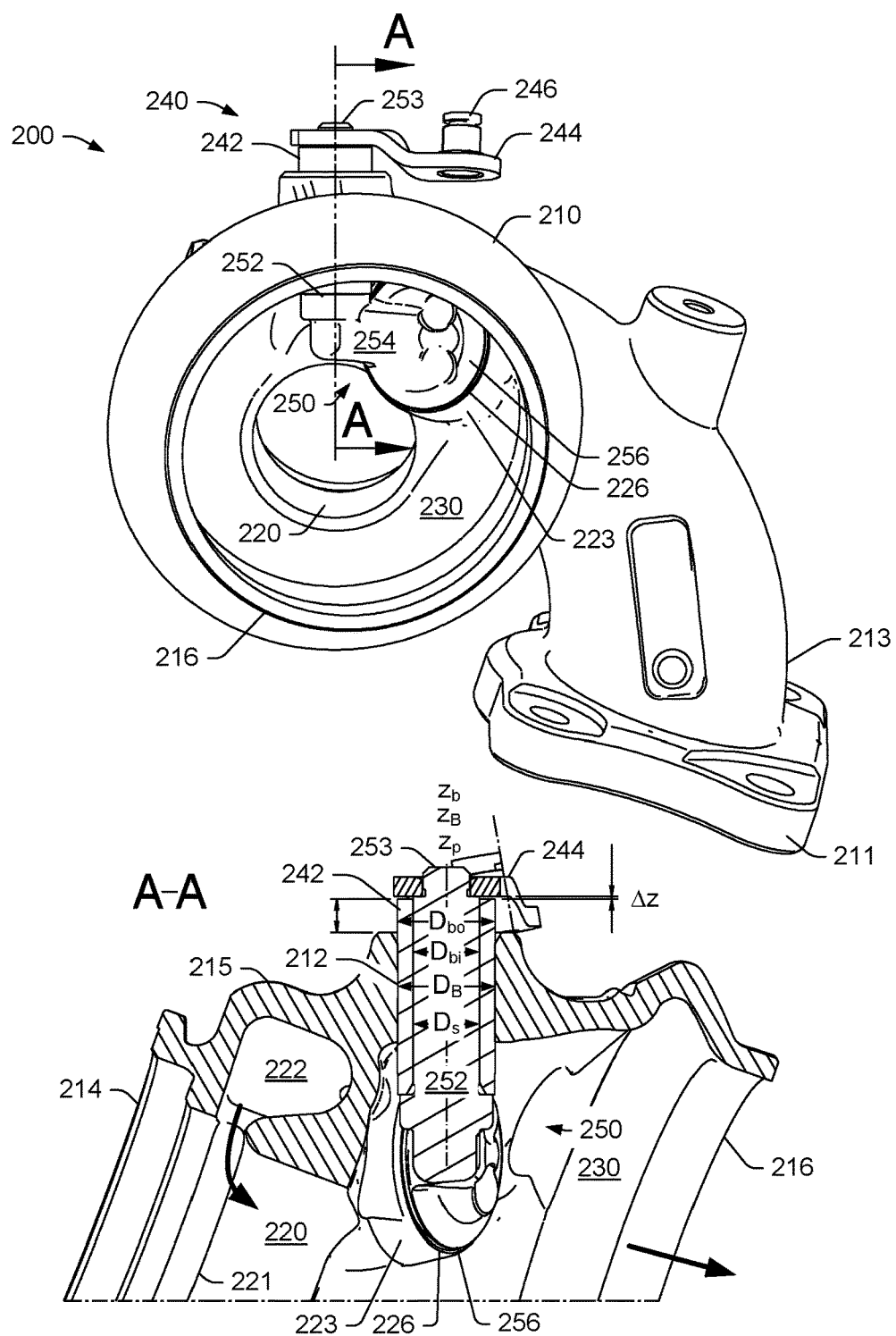
FIG. 2 is a series of view of an example of an assembly that includes a wastegate.

FIG. 2 shows an example of an assembly 200 that includes a turbine housing 210 that includes a flange 211, a bore 212, an inlet conduit 213, a turbine wheel opening 214, a spiral wall 215, an exhaust outlet opening 216, a shroud wall 220, a nozzle 221, a volute 222 formed in part by the spiral wall 215, a wastegate wall 223 that extends to a wastegate seat 226, and an exhaust chamber 230. In the example of FIG. 2, the turbine housing 210 may be a single piece or multi-piece housing. As an example, the turbine housing 210 may be a cast component (e.g., formed via a sand casting or another casting process). The turbine housing 210 includes various walls, which can define features such as the bore 212, the turbine wheel opening 214, the exhaust outlet opening 216, the chamber 230, etc. In particular, the wastegate wall 223 defines a wastegate passage in fluid communication with the inlet conduit 213 where a wastegate control linkage 240 and a wastegate arm and plug 250 are configured for opening and closing the wastegate passage (e.g., for wastegating exhaust).

In the example of FIG. 2, the wastegate control linkage 240 includes a bushing 242 configured for receipt by the bore 212 of the turbine housing 210, a control arm 244 and a peg 246 and the wastegate arm and plug 250 includes a shaft 252, a shaft end 253, an arm 254 and a plug 256. As shown, the bushing 242 is disposed between the bore 212 and the shaft 252, for example, to support rotation of the shaft 252, to seal the chamber 230 from an exterior space, etc. The bore 212, the bushing 242 and the shaft 252 may each be defined by a diameter or diameters as well as one or more lengths. For example, the shaft 252 includes a diameter $D_s$, the bore 212 includes a diameter $D_B$ while the bushing 242 includes an inner diameter $D_{bi}$ and an outer diameter $D_{bo}$. In the example of FIG. 2, when the various components are assembled, the diameters may be as follows: $D_B > D_{bo} > D_{bi} > D_s$. As to lengths, a length of the shaft 252 exceeds a length of the bushing 242, which exceeds a length of the bore 212. Such lengths may be defined with respect to a shaft axis $z_s$, a bushing axis $z_b$ and a bore axis $z_B$. As shown, the bushing 242 is disposed axially between a shoulder of the shaft 252 and the control arm 244 of the control linkage 240.

In the example of FIG. 2, a gap $\Delta z$ is shown between a surface of the bushing 242 and a surface of the control arm 244, which allows for axial movement of the shaft 252, for example, to facilitate self-centering of the plug 256 with respect to the wastegate seat 226.

As an example, the assembly 200 may be fitted to an exhaust conduit or other component of an internal combustion engine (see, e.g., examples of FIG. 1) via the flange 211 such that exhaust is received via the inlet conduit 213, directed to the volute 222. From the volute 222, exhaust is directed via the nozzle 221 to a turbine wheel disposed in the turbine housing 210 via the opening 214 to flow and expand in a turbine wheel space defined in part by the shroud wall 220. Exhaust can then exit the turbine wheel space by flowing to the chamber 230 and then out of the turbine housing 210 via the exhaust outlet opening 216.

As to wastegating, upon actuation of the control linkage 240 (e.g., by an actuator coupled to the peg 246), the wastegate arm and plug 250 may be rotated such that at least a portion of the received exhaust can flow in the wastegate passage defined by the wastegate wall 223, past the wastegate seat 226 and into the chamber 230, rather than through the nozzle 221 to the turbine wheel space. The wastegated portion of the exhaust may then exit the turbine housing 210 via the exhaust outlet opening 216 (e.g., and pass to an exhaust system of a vehicle, be recirculated in part, etc.).

As an example, the control linkage 240 may exert a force that acts to force the plug 256 in a direction toward the wastegate seat 226. For example, an actuator may include a biasing mechanism (e.g., a spring, etc.) that exerts force, which may be controllably overcome, at least in part, for rotating the plug 256 away from the wastegate seat 226 (e.g., for wastegating). As an example, an actuator may be mounted to a turbocharger (e.g., mounted to a compressor assembly, etc.). As an example, an actuator may be a linear actuator, for example, that includes a rod that moves along an axis. Depending on orientation of a plug, a shaft, a control linkage and such a rod, to maintain the plug in a closed position, the rod may exert a downward force (e.g., away from the control linkage as in the example of FIG. 2) or the rod may exert an upward force (e.g., toward the control linkage). For example, where the control arm 244 (e.g., and the peg 246) of the control linkage 240 are oriented on the same "side" as the plug 256 with respect to the shaft 252, a downward force applied to the control arm 244 (e.g., via the peg 246) may act to maintain the plug 256 in a closed position with respect to the wastegate seat 226; whereas, where, for example, an approximately 180 degree span exists between a plug and a control arm, an upward force applied to the control arm may act to maintain the plug in a closed position with respect to a wastegate seat.

As an example, a rod of an actuator may be biased to exert a force on a control linkage that causes the control linkage to exert a force on a plug (see, e.g., the plug 256) such that the plug seats against a wastegate seat (see, e.g., the wastegate seat 226). In such an example, the actuator may at least in part overcome the force that biases the rod such that a shaft rotates the plug away from the wastegate seat. For example, in FIG. 2, to initiate wastegating, the entire plug 256 rotates about an axis of the shaft 252 and moves away from the wastegate seat 226 (e.g., without any portion of the plug 256 moving into a wastegate opening defined by the wastegate seat 226). As an example, the moving away of the plug 256 may be facilitated by exhaust pressure. For example, in a closed position, the plug 256 experiences a pressure differential where pressure is higher below the plug 256 and less above the plug 256. In such an example, the pressure below the plug 256 acts in a direction that is countered by the closing force applied to the plug 256 via the control linkage 240 (e.g., the pressure differential acts to bias the plug 256 toward an open position). Accordingly, the closing force applied to the plug 256 should overcome pressure force from below the plug 256. Further, where the shaft 252 may include some play (see, e.g., $\Delta z$, etc.), the closing force applied to the plug 256 may cause the plug 256 to self-center with respect to the wastegate seat 226 (e.g., to facilitate sealing, to avoid exhaust leakage, etc.).

In the example of FIG. 2, the axes of the bore 212, the bushing 242 and the shaft 252 are shown as being aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures<−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

As an example, a plug may include a contact portion and an aerodynamic portion. For example, a plug may include a radiused portion as a contact portion that contacts a surface of a wastegate seat in a closed state and an aerodynamic portion that defines a flow passage with respect to the surface of the wastegate seat in an open state. In such an example, the aerodynamic portion may extend into a wastegate passage in the closed state (e.g., without contacting a surface that defines the wastegate passage, a surface of the wastegate seat, etc.). As an example, in an assembly, such a plug may be configured to self-center with respect to a wastegate seat (e.g., in a closed state). As an example, a surface of a wastegate seat may be conical, which may facilitate self-centering of a contact portion of a plug. As an example, one or more clearances may exist in an assembly for a wastegate shaft with respect to a bushing such that the wastegate shaft may move in a manner that allows for self-centering of a wastegate plug, operatively coupled to the wastegate shaft, with respect to a wastegate seat.

Figure 3:
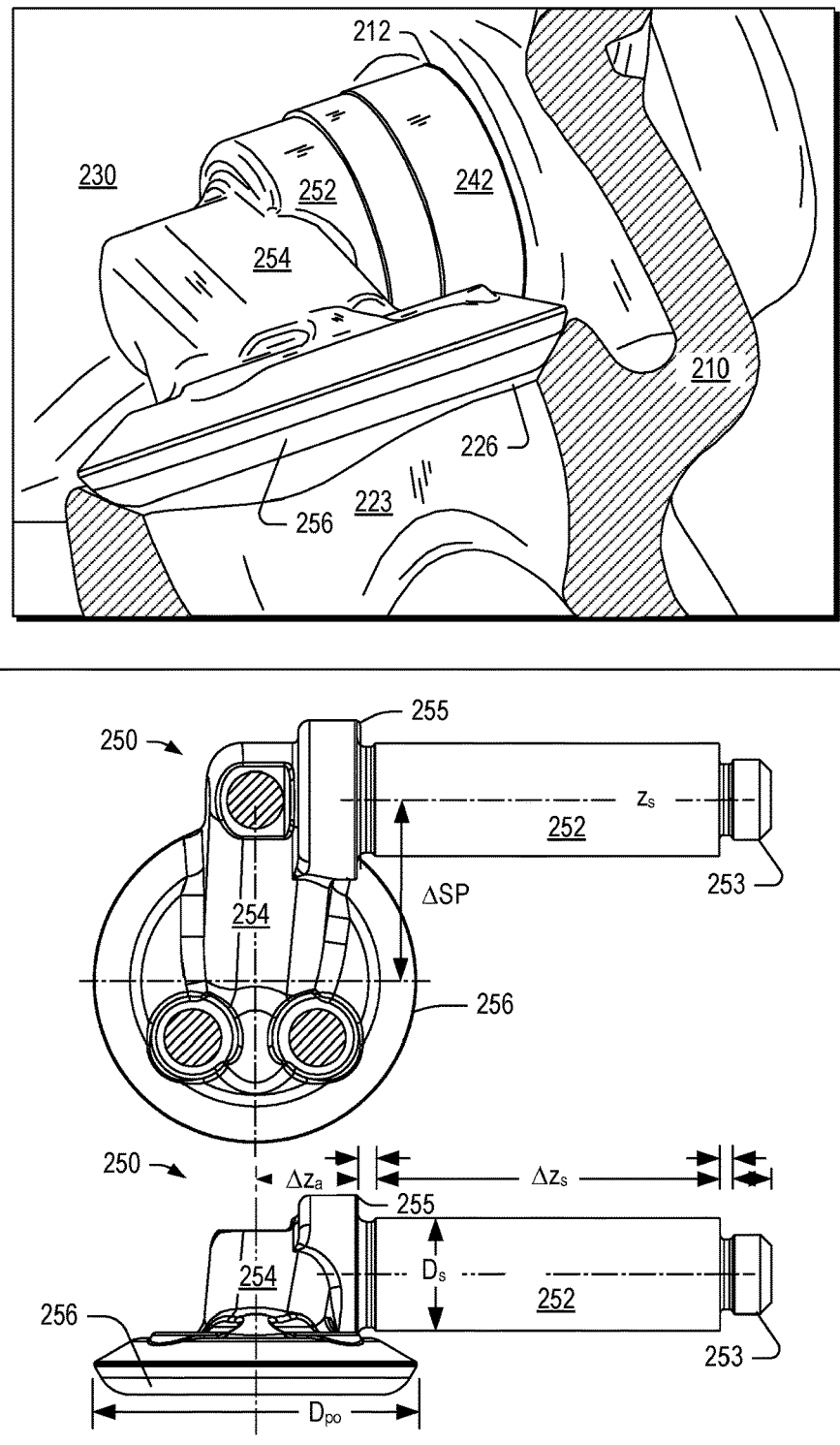
FIG. 3 is a series of views of an example of an assembly that includes a wastegate and views of an example of a wastegate.

FIG. 3 shows a view of a portion of the assembly 200 of FIG. 2 along with views of an example of the wastegate arm and plug 250. As described above, the wastegate arm and plug 250 can include a shaft 252, a shaft end 253, an arm 254 and a plug 256. As an example, the wastegate arm and plug 250 can be a monoblock wastegate arm and plug where monoblock refers to a component being made of a single unitary "block" (e.g., via machining of metallic stock or other process) or formed as a single unitary component (e.g., via casting or other process), which may be in a final or near final form. As an example, a shaft may be a component that is formed separately and fit to a monoblock component that includes an arm and a plug. In such an example, the shaft may be fit in a manner that physically prevents movement of the shaft separately from movement of the arm and the plug. As an example, a monoblock arm and plug and/or a monoblock shaft, arm and plug may be made of a material such as HK 30 alloy (e.g., C at 0.20-0.50; Cr at 24.0-27.0; Ni at 19.0-22.0; Si at 0.75-1.30; Mn at ≤1.50; Mo at 0.20-0.30; Fe at balance; and other optionally Nb at 1.00-1.75, noting values as weight percent).

In the example of FIG. 3, the wastegate arm and plug 250 includes a shoulder 255. Such a shoulder may define an axial face, which may be an annular axial face. As an example, the shoulder 255 may abut an end of the bushing 242. As an example, the shaft 252 may be considered to be of a length defined from the end of the shaft 253 to the shoulder 255 or may be considered to be of a length defined from the end of the shaft 253 to, for example, a centerline of the arm 254. As shown in FIG. 3, a dimension $\Delta SP$ can be a shaft-to-plug dimension where rotation of the shaft 252 about its longitudinal axis causes rotation of the plug 256 along an arc defined by a radius, which can be the dimension $\Delta SP$. FIG. 3 also shows a journal portion of a shaft with a length $\Delta z_s$ and an axial length of an arm $\Delta z_a$ from the shoulder 255 to an axis of the plug 256.

As implemented in an internal combustion engine application, some misalignment of components of a wastegate assembly may occur. In FIG. 3, the shaft 252 is shown as including an axis $z_s$ that may become misaligned with an axis $z_b$ of the bushing 242. For example, the bushing 242 may be received with minimal radial clearance with respect to the bore 212 of the housing 210 while a radial clearance may exist (e.g., a larger radial clearance) between the shaft 252 and an inner surface of the bushing 242. In such a manner, the shaft 252 may tilt with respect to the axis of the bushing 242 and, for example, the axis of the bore 212 ($z_B$). As an example, contact points may determine a maximal extent of misalignment with respect to tilting of the axis of the shaft 252 ($z_s$) with respect to the axis of the bushing 242 ($z_b$). As an example, such tilt may be represented by a tilt angle.

As an example, an axial gap Δz can exist between an outwardly facing end of the bushing 242 disposed at an axial position and an inwardly facing surface of the control arm 244 disposed at an axial position. In such an example, the axial gap may be defined by the difference between these two axial positions. As an example, the shaft 252 may be able to move axially where the axial distance may be limited in part by the end of the bushing 242, which defines, in part, the axial gap Δz. For example, the inwardly facing surface of the control arm 244 may contact the end of the bushing 242, which, in turn, may limit axial inward movement of the shaft 252.

As mentioned, the shaft 252 may tilt and may move axially where such movements may be limited (e.g., as to axial movement see Δz). As an example, the wastegate arm and plug 250 may act to self-center with respect to the wastegate seat 226 responsive to force applied to the control arm 244 (e.g., which is transmitted to the wastegate arm and plug 250 via the shaft 252, whether integral therewith or operatively coupled thereto). In such an example, self-centering may occur for effective sealing of the wastegate within the range of clearances that allow for axial and/or angular movement of the shaft 252.

As an example, during operational use, one or more clearances between various components (e.g., plug, arm, shaft, bore, bushing, etc.) may change. Forces that can cause such change include aerodynamic excitation, high temperatures, temperature cycling (e.g., temperatures<−20 degrees C. to >1000 degrees C.), chemical attack, friction, deterioration of materials, etc. For at least the foregoing reasons, it may be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

As an example, one or more pieces may be from a blank (e.g., a blank bar, stock, etc.). As an example, one or more pieces may be cast (e.g., from a molten material that can harden upon cooling). As an example, a material of construction of a piece may be a metal. As an example, a material of construction of a piece may be an alloy. As an example, a material (e.g., a metal, an alloy, etc.) may be selected based on operational conditions (e.g., operational conditions of an exhaust gas turbine) and, for example, ability to be welded to another piece. As an example, a unit may be formed of a high temperature metal and/or a high temperature alloy. As an example, a piece may be formed of an alloy such as, for example, a NiCrFe-based alloy (e.g., HASTALLOY™ material, INCONEL™ material, etc.) or another alloy. As an example, a piece may be formed of a stainless steel or another type of steel.

As an example, a weld may be formed between two or more components where the weld can withstand operating conditions (e.g., temperatures, etc.) of an exhaust gas turbine of a turbocharger operatively coupled to an internal combustion engine (e.g., gasoline, diesel, flex-fuel, bi-fuel, etc.).

As an example, a plug can include a shape such as, for example, a shape of a hemisphere (e.g., a substantially hemispherical shell plug, a substantially hemispherically solid plug, etc.). As an example, a plug can include a toroidal portion that defines a convex surface that can contact a wastegate seat. In such an example, the plug can include a protruding portion that may extend into a portion of a wastegate passage at least in part when the plug is in a closed orientation with respect to the wastegate passage, for example, where the convex surface contacts the wastegate seat. As an example, a plug can include a concave surface, which may be, for example, a domed concave surface that faces a wastegate passage. As an example, a concave surface may be interior to a convex surface that can contact a wastegate seat. As an example, a concave surface may act to distribute pressure. As an example, a convex surface that can extend into a wastegate passage may act to distribute pressure in a different manner. For example, where exhaust flows and impinges upon the convex surface, one or more stagnation points may form that may also coincide with pressure or force points where pressure or force may be at a global maximum or local maxima on a plug with respect to exhaust flow.

Figure 4:
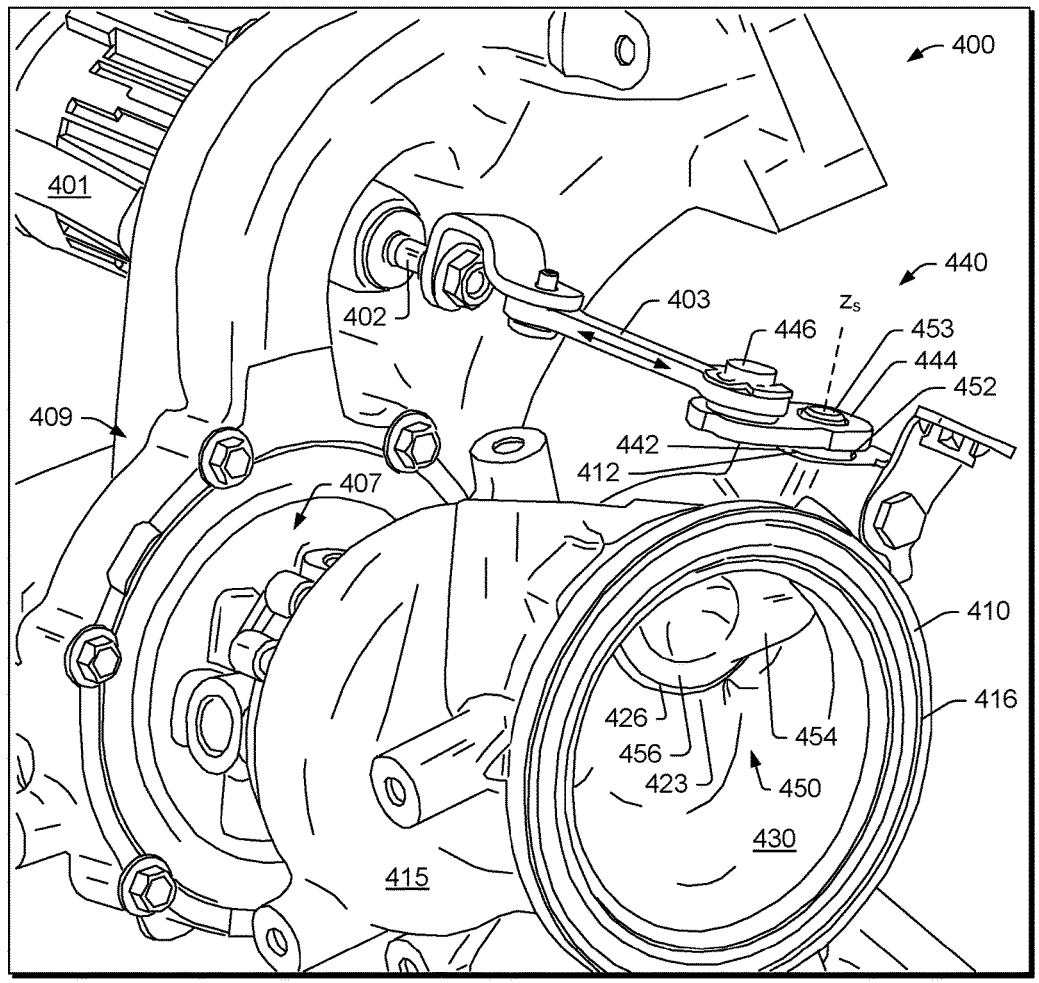
FIG. 4 is a perspective view of an example of a turbocharger.

FIG. 4 shows an example of an assembly 400 that includes an actuator 401, an actuation rod 402, an actuator linkage 403, a center housing 407 (e.g., to house a bearing, bearings, etc. for a turbocharger shaft, etc.), a compressor housing 409, a turbine housing 410 that includes a bore 412, a spiral wall 415 (e.g., that defines, in part, a volute), an exhaust outlet opening 416, a wastegate wall 423 that extends to a wastegate seat 426, and an exhaust chamber 430.

In the example of FIG. 4, the turbine housing 410 may be a single piece or multi-piece housing. As an example, the turbine housing 410 may be a cast component (e.g., formed via sand casting or other casting process). As shown, the turbine housing 410 includes various walls, which can define features such as the bore 412, a turbine wheel opening, an exhaust outlet opening, the chamber 430, etc. In particular, the wastegate wall 423 defines a wastegate passage in fluid communication with an inlet conduit where a wastegate control linkage 440 and a wastegate shaft, arm and plug unit 450 are configured for opening and closing the wastegate passage (e.g., for wastegating exhaust).

In the example of FIG. 4, the wastegate control linkage 440 includes a bushing 442 configured for receipt by the bore 412 of the turbine housing 410, a control arm 444 and a peg 446 and the wastegate shaft, arm and plug unit 450 includes a shaft 452, a shaft end 453, an arm 454 and a plug 456. As shown, the bushing 442 is disposed between the bore 412 and the shaft 452, for example, to support rotation of the shaft 452, to seal the chamber 430 from an exterior space, etc. The bore 412, the bushing 442 and the shaft 452 may each be defined by a diameter or diameters as well as one or more lengths.

As an example, the assembly 400 may be fitted to an exhaust conduit or other component of an internal combustion engine (see, e.g., examples of FIG. 1) via a flange such that exhaust is received via an inlet conduit that may direct exhaust to a volute (e.g., or volutes) that may be defined at least in part by the spiral wall 415. As an example, a volute (e.g., or volutes) may direct exhaust (e.g., via a nozzle or nozzles) to a turbine wheel disposed in the turbine housing 410 where the exhaust may flow and expand in a turbine wheel space defined in part by the turbine housing 410. Exhaust may then exit the turbine wheel space by flowing to the chamber 430 and then out of the turbine housing 410 via the exhaust outlet opening 416.

As to wastegating, upon actuation of the control linkage 440 (e.g., by the actuator linkage 403 being operatively coupled to the peg 446), the wastegate shaft, arm and plug unit 450 may be rotated such that at least a portion of the received exhaust can flow in the wastegate passage defined by the wastegate wall 423, past the wastegate seat 426 and into the chamber 430, rather than through a nozzle to a turbine wheel space. The wastegated portion of the exhaust may then exit the turbine housing 410 via the exhaust outlet opening 416 (e.g., and pass to an exhaust system of a vehicle, be recirculated in part, etc.).

As an example, the control linkage 440 may exert a force that acts to force the plug 456 in a direction toward the wastegate seat 426. For example, the actuator 401 may include a biasing mechanism (e.g., a spring, etc.) that exerts force, which may be controllably overcome, at least in part, for rotating the plug 456 away from the wastegate seat 426 (e.g., for wastegating). As an example, the actuator 401 may be mounted to the assembly 400. As an example, the actuator 401 may be a linear actuator, for example, for moving the rod 402 along an axis. Depending on orientation of a plug, a shaft, a control linkage and such a rod, to maintain the plug in a closed position, the rod may exert a downward force (e.g., away from the control linkage as in the example of FIG. 4) or the rod may exert an upward force (e.g., toward the control linkage). For example, where the control arm 444 (e.g., and the peg 446) of the control linkage 440 are oriented on the same "side" as the plug 456 with respect to the shaft 452, a downward force applied to the control arm 444 (e.g., via the peg 446) may act to maintain the plug 456 in a closed position with respect to the wastegate seat 426; whereas, where, for example, an approximately 180 degree span exists between a plug and a control arm, an upward force applied to the control arm may act to maintain the plug in a closed position with respect to a wastegate seat.

As an example, the rod 402 of the actuator 401 may be biased to exert a force on the control linkage 440 that causes the control linkage 440 to exert a force on the plug 456 such that the plug 456 seats against the wastegate seat 426. In such an example, the actuator 401 may at least in part overcome the force that biases the rod 402 such that the shaft 452 rotates the plug 456 away from the wastegate seat. For example, in FIG. 4, to initiate wastegating, the entire plug 456 rotates about an axis of the shaft 452 and moves away from the wastegate seat 426 (e.g., without any portion of the plug 456 moving into a wastegate opening defined by the wastegate seat 426). As an example, the moving away of the plug 456 may be facilitated by exhaust pressure. For example, in a closed position, the plug 456 experiences a pressure differential where pressure is higher below the plug 456 and less above the plug 456. In such an example, the pressure below the plug 456 acts in a direction that is countered by the closing force applied to the plug 456 via the control linkage 440 (e.g., the pressure differential acts to bias the plug 456 toward an open position). Accordingly, the closing force applied to the plug 456 should overcome pressure force from below the plug 456. Further, where the shaft 452 may include some play (e.g., axial play, etc.), the closing force applied to the plug 456 may cause the plug 456 to move with respect to the wastegate seat 426.

As an example, a method can include in situ welding of a wastegate that includes a shaft, an arm and a plug. In such an example, the wastegate can be a monoblock wastegate where at least the arm and plug are a unitary piece. In such an example, the monoblock wastegate can be a single component that includes a shaft, an arm and a plug, which may be defined by dimensions. Such dimensions may limit orientation of the monoblock wastegate with respect to a turbine housing that includes a bore that can receive the shaft and that includes a wastegate seat that can seat the plug to cover a wastegate passage.

As an example, a monoblock wastegate arm and plug can provide various benefits when compared to a three piece arm and plug design in terms of durability and impact on noise generated by system kinematics.

As mentioned, a plug can include a convex surface that may be, for example, a portion of a sphere or a portion of a torus. Such a convex surface may be considered to be a contact surface or a sealing surface that can contact a wastegate seat in a closed orientation to obstruct a wastegate passage. As an example, a wastegate seat may be defined at least in part by a portion of a cone. For example, a wastegate seat can be a conical wastegate seat. In such an example, a convex surface of a plug may self-center with respect to the wastegate seat, for example, due in part to force applied to the plug via a shaft and an arm.

As an example, a method can include in situ connecting of components, for example, via welding. In such an example, the method can include applying force to a plug to seat it with respect to a wastegate seat. For example, a tool (e.g., a rod, a jig, etc.) may be used to apply force to a plug to seat it with respect to a wastegate seat. Such an approach may act to apply force to substantially center a plug with respect to a wastegate seat where, for example, welding may be performed to connect components while the plug is substantially centered. As an example, application of force may act to reduce axial play of an assembly.

Figure 5:
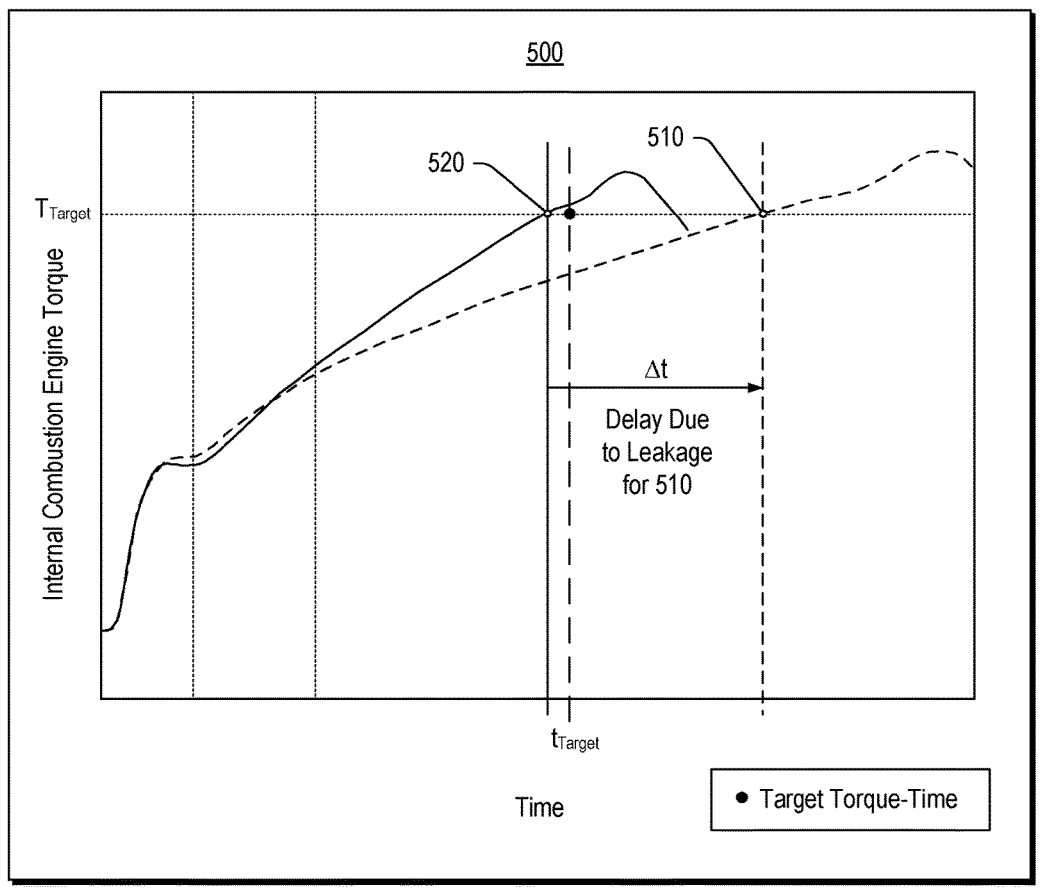
FIG. 5 is an example of a plot of data.

FIG. 5 shows an example plot 500 of torque generated by an internal combustion engine versus time with respect to two different wastegate assemblies 510 and 520. As shown, the wastegate assembly 520 can operate in a manner that decreases time for an internal combustion engine to achieve a level of torque (e.g., a torque target, $T_{Target}$) when compared to the wastegate assembly 510, which exhibits some leakage. As to the lesser time, the wastegate assembly 520 is assembled using a shimming approach. Such an approach allows for achieving a desired level of torque in a lesser time than the assembly 510 where the desired level of torque is achieved within a target time (see, e.g., $t_{Target}$) due to adequate sealing of a wastegate passage (e.g., a plug portion seated against a wastegate seat to close a wastegate passage). In the example plot 500, the profiles of torque versus time correspond to a change of in operational conditions associated with an amount of exhaust pressure. The example plot 500 demonstrates how a method of manufacture can achieve desired clearances of an assembly that includes a monoblock arm and plug such that a desired amount of sealing is exhibited in operation of a turbocharged internal combustion engine. Such an assembly may be less prone to wear, rattling (e.g., noise), performance degradation over time when compared to an assembly that includes an arm and a plug as separate pieces. As an example, a monoblock arm and plug approach can include a torus as part of a plug and a cone as part of a wastegate seat, for example, in contrast to a flat surface plug and a flat surface wastegate seat.

Figure 6:
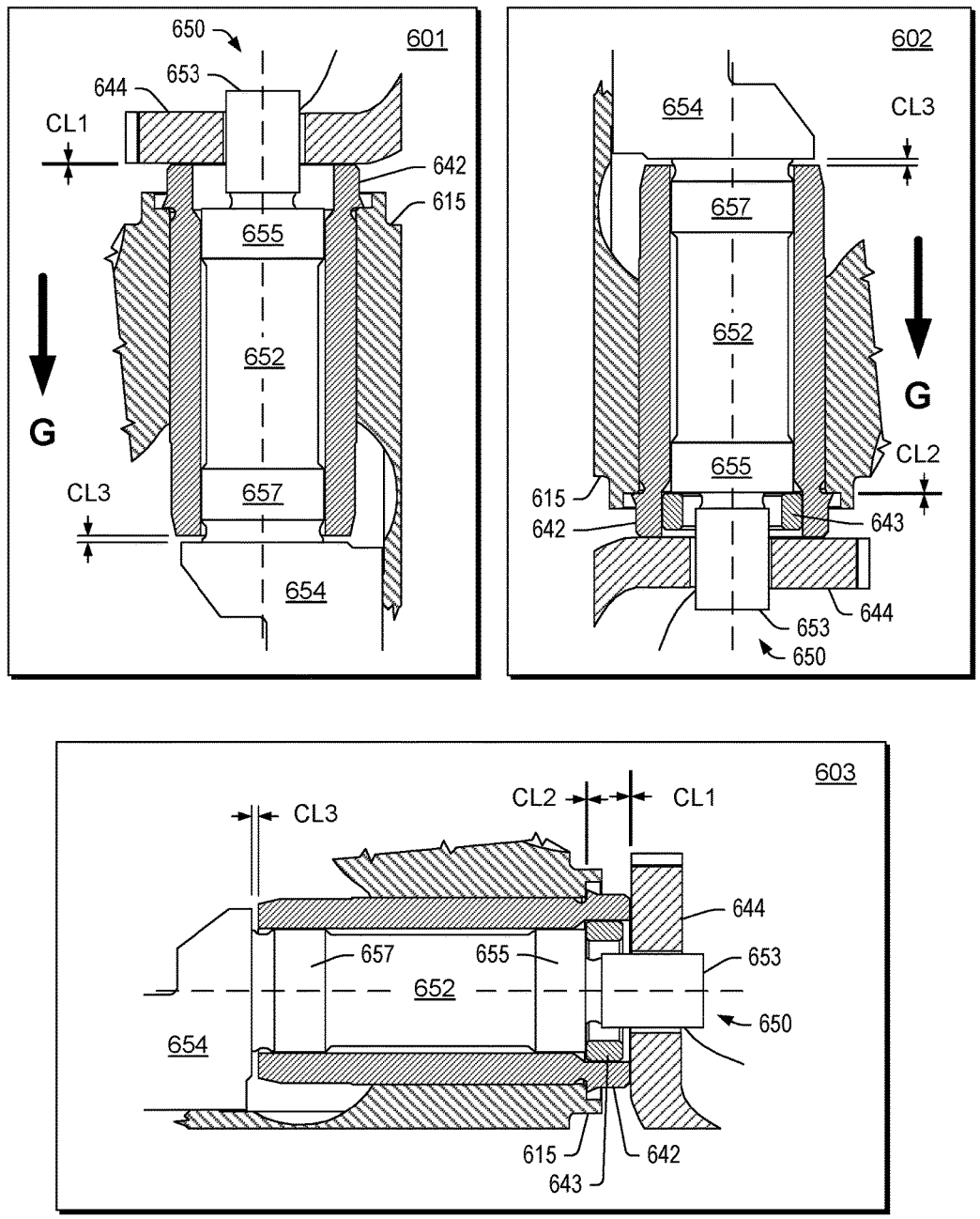
FIG. 6 is a series of views of examples of portions of assemblies.

FIG. 6 shows various examples of assemblies 601, 602 and 603 as oriented with respect to gravity, which is shown via an arrow and a label "G", as being directed downwardly.

As shown, the assembly 601 includes a housing 615, a bushing 642 disposed in a bore of the housing 615, a control arm 644 which is operatively coupled to a wastegate 650 that includes, a shaft 652, a shaft end 653 and an arm 654 that extends to a plug of the wastegate 650 where the shaft end 653 is oriented upwardly with respect to gravity and where the arm 654 is oriented downwardly with respect to gravity. In the example assembly 601, the shaft 652 can include one or more journals 655 and 657.

As shown, the assembly 602 includes a housing 615, a bushing 644 disposed in a bore of the housing 615, a ring 643, a control arm 644 which is operatively coupled to a wastegate 650 that includes, a shaft 652, a shaft end 653 and an arm 654 that extends to a plug where the shaft end 653 is oriented downwardly with respect to gravity and where the arm 654 is oriented upwardly with respect to gravity. In the example assembly 602, the shaft 652 can include one or more journals 655 and 657.

As shown, the assembly 603 includes a housing 615, a bushing 644 disposed in a bore of the housing 615, a ring 643, a control arm 644 which is operatively coupled to a wastegate 650 that includes a shaft 652, a shaft end 653 and an arm 654 that extends to a plug where the shaft end 653 and the arm 654 are oriented substantially normal to gravity (e.g., substantially horizontally). In the example assembly 603, the shaft 652 can include one or more journals 655 and 657.

In the assemblies 601, 602 and 603, various clearances are illustrated, including CL1, which is a clearance between an end of the bushing 642 and a surface of the control arm 644, CL2, which is a clearance between the journal 655 of the shaft 652 and a surface of the ring 643, and CL3, which is a clearance between a surface of the bushing 642 and a surface of the shaft 650, for example, a shoulder of the arm 654.

Table 1, below, includes various examples of dimensions for purposes of comparing the assemblies 601, 602 and 603 as to orientation and as to estimates of product and/or manufacturing risk. In such examples, manufacturing can include welding the control arm 644 to the wastegate 650.

TABLE 1

Examples of Example Assemblies 601, 602 and 603.

|  | Assembly 601 (no ring) | Assembly 602 (with ring 643) | Assembly 603 (with ring 643) |
|---|---|---|---|
| Orientation wrt G | Plug Down | Plug Up | Any |
| CL1 | Process Control/Shim(s) | Not Dimensioning | Process Control/Shim(s) |
| CL2 | Not Applicable | Optionally Process Control/Ring Positioning Tool | Optionally Process Control/Ring Positioning Tool |
| CL3 | Stack Up | Stack Up | Stack Up |

As indicated in Table 1, for an assembly, one or more of the clearances CL1, CL2 and CL3 can exist and optionally be adjusted or set via one or more processes. As an example, the clearance CL1 may be adjusted or set to be within a range of distances.

As illustrated with respect to FIG. 6, tolerances as to a chain of components in a kinematic system can impact an ability to position a wastegate accurately enough to achieve satisfactory functioning of the wastegate with respect to a bore, a wastegate seat, etc.

As an example, a method can include in situ wastegate positioning during assembly. In such an example, the method may bypass a tolerance chain and help to improve sealing capability of the wastegate, which can be a monoblock wastegate. Such an approach may implement a ring (e.g., a piston ring, mesh ring, accordion ring, solid ring, porous ring, etc.), which may also help to reduce leakage of exhaust gas via a bore in a housing (e.g., in spaces that may exist between a bushing and shaft). Such a reduction in exhaust leakage can reduce risk of exhaust leakage in an engine compartment of a vehicle, which may be disposed in front of a passenger compartment of the vehicle. In general, exhaust form an internal combustion engine is directed via an exhaust system to an outlet that is at the back of a vehicle (e.g., where the vehicle travels predominantly forwardly).

As shown in the example assemblies 602 and 603 of FIG. 6, the ring 643 can be defined by an inner diameter and an outer diameter as well as an axial length. As shown, the journal 655 of the shaft 652 can be defined by an outer diameter that exceeds an outer diameter of a portion of the shaft 652 intermediate the journals 655 and 657 where the journal 655 can be defined in part by an axial length. As shown, the bushing 642 can be defined by one or more outer diameters and one or more inner diameters as well as an axial length.

In the example assemblies 602 and 603 of FIG. 6, the bushing 642 includes a first inner diameter and a second inner diameter that is larger than the first inner diameter. As shown, the inner diameter of the ring 643 can be less than the outer diameter of the journal 655 and less than the first inner diameter of the bushing 642 and the outer diameter of the ring 643 can be greater than the outer diameter of the journal 655 and less than the second inner diameter of the bushing 642. In such an example, the ring 643 can impede a direct line of exhaust flow between the outer diameter of the journal 655 and the first inner diameter of the bushing 642, which may act to reduce leakage of exhaust.

In the example assemblies 602 and 603 of FIG. 6, the ring 643 is disposed in a bore of the bushing 642. As an example, a ring may be of a different axial length where, for example, a portion of the ring extends past an end of the bushing 642 such that the clearance CL1 is defined in part by a surface of the ring 643.

In the example assemblies 602 and 603 of FIG. 6, the ring 643 can be welded to the bushing 642 and the control arm 644 can be welded to the shaft 652. In such an example, an axial distance between a shoulder of the journal 655 and a surface of the control arm 644 is greater than an axial length of the ring 643. In such an example, a clearance can be defined by a difference between the axial distance and the axial length (e.g., axial distance minus axial length). As an example, a clearance may be defined between an end of the bushing 642 and a surface of the control arm 644 where the control arm 644 is welded to the shaft 652.

As an example, where a shaft includes a shaft shoulder, where a ring is welded at least in part in a bushing and where a control arm is welded to the shaft, an axially inwardly facing surface of the ring can be an axial stop that delimits axial movement of the shaft in an outwardly direction and an axially outwardly facing surface of the bushing and/or the ring can be another axial stop that delimits axial movement of the shaft in an inwardly direction. In such an example, as the shaft is forced inwardly, a surface of the control arm can contact the axially outwardly facing surface of the bushing and/or the ring while, as the shaft is forced outwardly, an axially outwardly facing surface of the shaft shoulder can contact the axially inwardly facing surface of the ring.

As an example, the clearance CL2 in the example assembly 603 can be defined by welding of the ring 643 to the bushing 642 to form a ring weld and by welding of the control arm 644 to the shaft 652 to form a weld. As an example, a shim may be utilized during welding of the control arm 644 to the shaft 652, for example, to set a clearance. As an example, a shim may be disposed between an end of the bushing 642 and a surface of the control arm 644 or a shim may be disposed between an end of the ring 643 and a surface of the control arm 644.

As an example, during operation of a turbocharger wastegate, a shaft of the wastegate may translate inwardly or outwardly. In such an example, a ring welded to a bushing may delimit outward translation and a control arm welded to the shaft may delimit inward translation. As an example, amounts of possible translation (e.g., inward or outward) may be determined via one or more positioning and welding operations.

As an example, a method can include positioning an integral, unitary arm and a plug operatively coupled to a shaft and welding a control arm to the shaft. As an example, a method can include positioning an integral, unitary shaft, arm and a plug and welding a control arm to the shaft. In such examples, welding of a plug to an arm may be avoided, which would likely involve aligning the plug and the arm in a manner that promotes effective closing of a wastegate seat by the plug while, for example, assuring that risk of leakage about a shaft and bushing, a bushing and bore, etc. is adequately minimized. Avoidance of in situ welding of a plug to an arm can help to avoid risk of failure as to decoupling of the plug from the arm, for example, which may occur where a wastegate is subjected to harsh or otherwise detrimental environmental conditions.

As an example, a method can include inserting a monoblock arm with a toroidal plug into a bushing disposed in a bore of a turbine housing where the toroidal plug is seated in a conical wastegate seat. For example, a plug can include a contact surface that is a convex surface defined in part by a portion of a torus where the convex surface contacts a conical surface of a wastegate seat. In such an example, force applied between the plug and the wastegate seat in a substantially normal direction (e.g., to a central axis of the plug and a central axis of the wastegate seat), can act to center the plug and the wastegate seat with respect to each other.

In the foregoing method, once the plug is seated in the wastegate seat via application of force, a ring can be inserted from an exterior side at least in part into a bore of a bushing and, for example, seated on or proximate to a surface of the journal 655 of the shaft to limit axial position. Next, an external crank (e.g., a control arm) can be welded, for example, with an appropriate clearance on the outer side of a ring to delimit the clearance in another direction. In such an example, an assembly can be operated with built-in self-centering as self-centering is applied during assembly and maintained via selection of one or more clearances (e.g., one or more clearances of the order of about 0.1 mm or less). Such an approach can provide an assembly with a relatively small axial clearance, which, as mentioned, can be operational in a manner that assures a plug is substantially centered with respect to a wastegate seat during operation (e.g., as part of a turbocharger).

Figure 7:
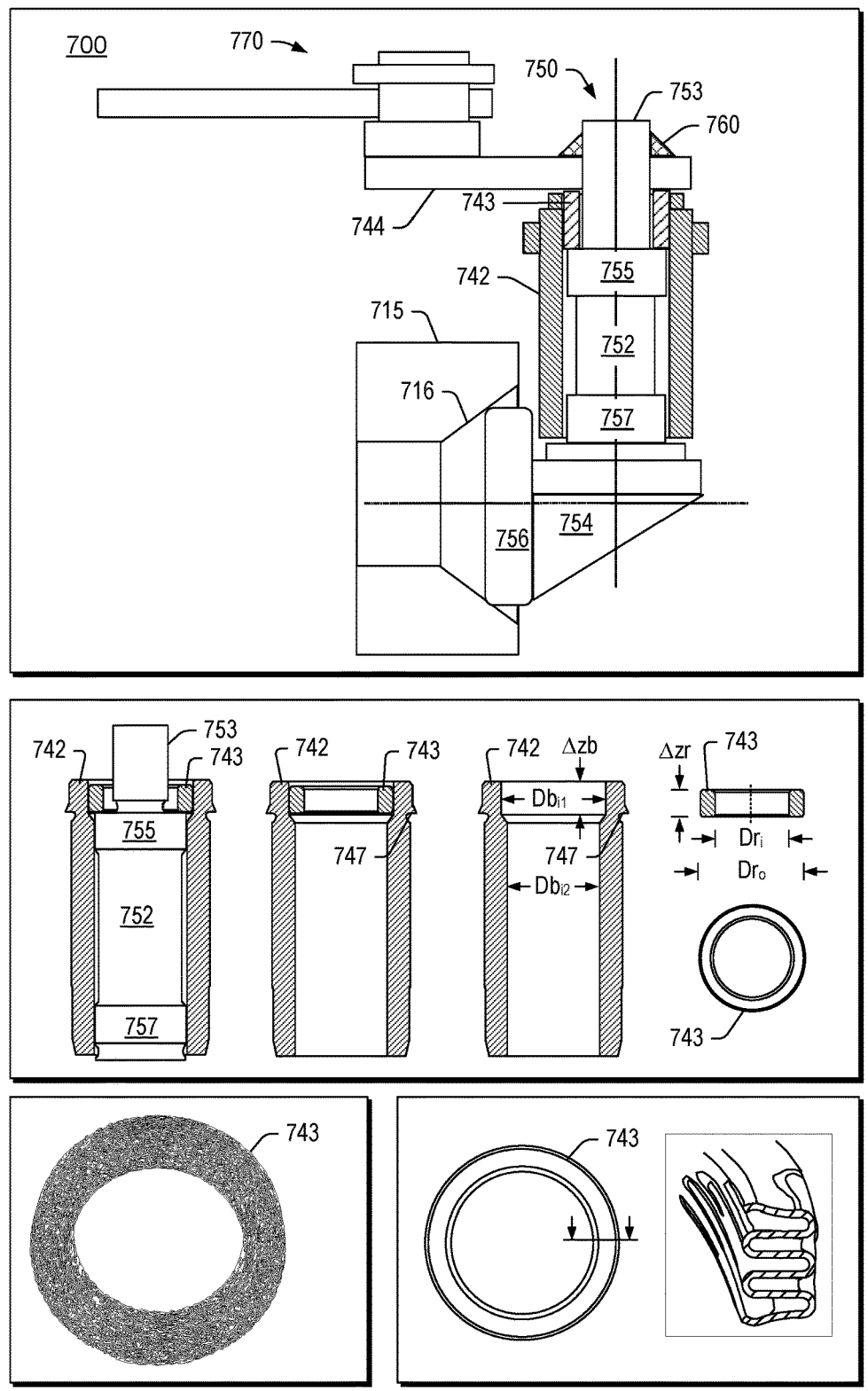
FIG. 7 is an approximate view of an example of an assembly.

FIG. 7 shows an example of an assembly 700 that includes a housing 715 that defines a wastegate seat 716, a bushing 742, a ring 743, a control arm 744, a wastegate 750, a weld 760 and a control linkage 770 operatively coupled to the control arm 744. As shown, the wastegate 750 includes a shaft 752, a shaft end 753, an arm 754 and a plug 756 where the shaft 752 can include one or more journals 755 and 757. As shown in the example of FIG. 7, the journal 755 is a control arm side journal and the journal 757 is an arm side journal.

As shown in FIG. 7, the bushing 742 can be defined by various dimensions. For example, the bushing 742 can include plurality of inner diameters such as a first inner diameter $Db_{i1}$ that corresponds to a ring seating bore portion of the bushing 742 and a second inner diameter $Db_{i2}$ that is greater than an outer diameter of the shaft 752 at the journals 755 and 757. As shown in the example of FIG. 7, the first inner diameter is larger than the second inner diameter and the ring 743 can be seated at least in part over a portion of a through bore of the bushing 742 that is at the first inner diameter. As shown in FIG. 7, the bushing 742 may be defined in part by an axial dimension $\Delta zb$, which corresponds to the first inner diameter portion of the through bore of the bushing 742.

As shown in FIG. 7, the bushing 742 can include an exterior shoulder 747. As shown, the shoulder 747 can include an axial face that can abut a surface of a housing (see, e.g., FIG. 6 where a recessed surface about a bore of the housing 615 is in contact with a shoulder of the bushing 642). As an example, the shoulder 747 may be a locating surface that axially locates the bushing 642 in a bore of a housing. As an example, a bushing can be interference fit into a bore of a housing such that the bushing is fixed with respect to its axial position. In such an example, a portion of the bushing can extend axially from one end of the bore of the housing to an exterior space and can extend axially from another end of the bore of the housing to an interior space. As mentioned, a valve assembly can aim to hinder flow of exhaust from such an interior space to such an exterior space via a bore in which a shaft is disposed where rotation of the shaft causes a valve of the valve assembly to move from one state to another state (e.g., close to open and open to closed).

As an example, the ring 743 can be defined in part by an axial dimension $\Delta zr$, which may less than, equal to or greater than the axial dimension $\Delta zb$ of the bushing 742. The ring 743 can be defined in part by an inner diameter $Dr_i$ and an outer diameter $Dr_o$ where the outer diameter $Dr_o$ is less than the diameter $Db_{i1}$ of the bushing 742.

As shown in FIG. 7, the ring 743 may optionally be a mesh ring 743. For example, consider a metal wire mesh ring that is made of metal wire that is compressed to form a ring. Such metal wire may be alloy wire (e.g., a material that includes multiple metals). As shown, the ring 743 may be a convoluted ring such as an accordion ring. As an example, the ring 743 may be formed via one or more coned washers (e.g., Bellville washers).

As an example, the ring 743 may be resilient to a predetermined extent (e.g., a resilient ring). For example, a ring may have a first shape and absorb energy when loaded with force with a corresponding change in the first shape to a second shape and then return to the first shape after unloading of the force. As an example, the ring 743 may be characterized in part by a compressibility, which may optionally be approximately zero or may be of a value akin to a spring constant where force can compress the ring 743 in its axial dimension, however, a limited amount that may be predetermined and that may be non-linear with respect to force. For example, a ring may be defined in part by an uncompressed axial length in an uncompressed state and a compressed axial length in a compressed state. During operation of a turbocharger, the ring may be of an axial length that is in a range between the uncompressed axial length and the compressed axial length. As an example, the difference between these two lengths may be an axial distance that is, for example, less than 1 mm, for example, less than about 0.5 mm, for example, less than about 0.1 mm or, for example, less than about 0.05 mm.

As an example, a ring may be a resilient ring that includes a pre-determined uncompressed operational axial length and a predetermined compressed operational axial length where a difference between the axial lengths is less than a specified axial distance.

As an example, a ring can be tacked to a bushing (e.g., welded, etc.) such that at least a portion of the ring is axially fixed. In such an example, where the ring is a resilient ring, the ring may change in its axial length a limited amount where the limited amount may be measured from the axially fixed portion of the ring. For example, consider a mesh ring that is welded to a bushing along an edge of an outer face where an inner face of the mesh ring may come into contact with a surface of a shaft (e.g., an axial face of a journal) where the mesh ring can be compressed to a predetermined amount that may be determined based at least in part on an expected amount of force that the shaft may apply to the ring. As an example, a resilient ring may be non-rotatable, may be axially fixed (e.g., at a portion of the resilient ring) and may be axially compressible to a limited amount.

As an example, in an operational state, where a surface of a shaft is in contact with a surface of a ring (e.g., CL2 is zero), the surfaces may be relatively smooth such that friction is minimal (e.g., due to rotation of the shaft against a non-rotatable ring). As an example, a mesh ring may be constructed of compressed wire such that surface of a side of the mesh ring is reduced in comparison to a solid ring. In such an example, friction may be reduced when compared to a solid ring. As an example, where a ring is resilient, the ring may act to absorb energy such as axial thrust energy associated with axial movement of a shaft. In such an example, the ring may help to damp energy and reduce wear of one or more components of an assembly.

As an example, a ring can form a tortuous path for passage of gas (e.g., exhaust gas). For example, a solid ring, a porous ring, a mesh ring or an accordion ring may form one or more tortuous paths that can act to hinder passage of gas. In such an example, where a ring is compressible, the paths may be altered and, for example, hinder gas flow to a greater extent when compressed. As an example, a ring may be characterized at least in part by a Poisson's ratio (e.g., Poisson effect) where an amount of axial compression or expansion corresponds to an amount of radial expansion or compression, respectively. As an example, a ring may be made of metal, alloy, carbon fiber, ceramic, or a composite material. As an example, a material of construction and/or a shape of a ring may determine a Poisson's ratio of a ring. For example, a solid metal ring may have a Poisson's ratio of the solid metal; whereas, a mesh ring (e.g., or an accordion ring, etc.) may have a Poisson's ratio determined by the shape of the mesh ring and, for example, how the mesh ring was constructed (e.g., amount of wire, compression force to form the mesh ring, etc.).

In the example of FIG. 7, the ring 743 can be a piston type of ring that can be a metallic ring (e.g., metal, alloy), a ceramic ring or a composite material ring. In the example of FIG. 7, the weld 760 can operatively couple the control arm 744 to the shaft 750 (e.g., proximate to the shaft end 753). As an example, a ring can be a metallic ring formed of a self-lubricating steel (e.g., low friction steel alloys). As an example, a bushing may be formed of a metal or an alloy. As an example, a bushing can be made of a self-lubricating steel. As an example, a part (e.g., a ring, a bushing, etc.) may be cast and/or sintered. As an example, a turbine housing may be made of metal or alloy. As an example, a turbine housing may be a cast iron or a cast stainless steel. As an example, a wastegate seat may be machined, for example, to achieve a desired finish.

As an example, the ring 743 can be a position limiting ring. As an example, the ring 743 can be a position limiting ring with a radial pre-load acting as an axial stopper for the arm in an outward direction. As an example, the ring 743 can be a welded ring that is fixed to the bushing 742 via a weld. As an example, the ring 743 can act to limit control arm position variation where the ring 743 can be operatively coupled to a bushing via one or more types of coupling mechanisms such as, for example, one or more of welding, friction (e.g., a piston-ring-like part, etc.), interference fit (e.g., press fit, etc.), threads, bayonet, etc. As an example, a coupling mechanism can fix an axial position of a ring with respect to a bushing. As an example, the ring 743 may be a mesh ring, an accordion ring, a solid ring, a porous ring, etc. As an example, a plurality of rings may be utilized where at least one of the rings is fixed to encase one or more other rings (e.g., in a bore of a bushing).

Figure 8:
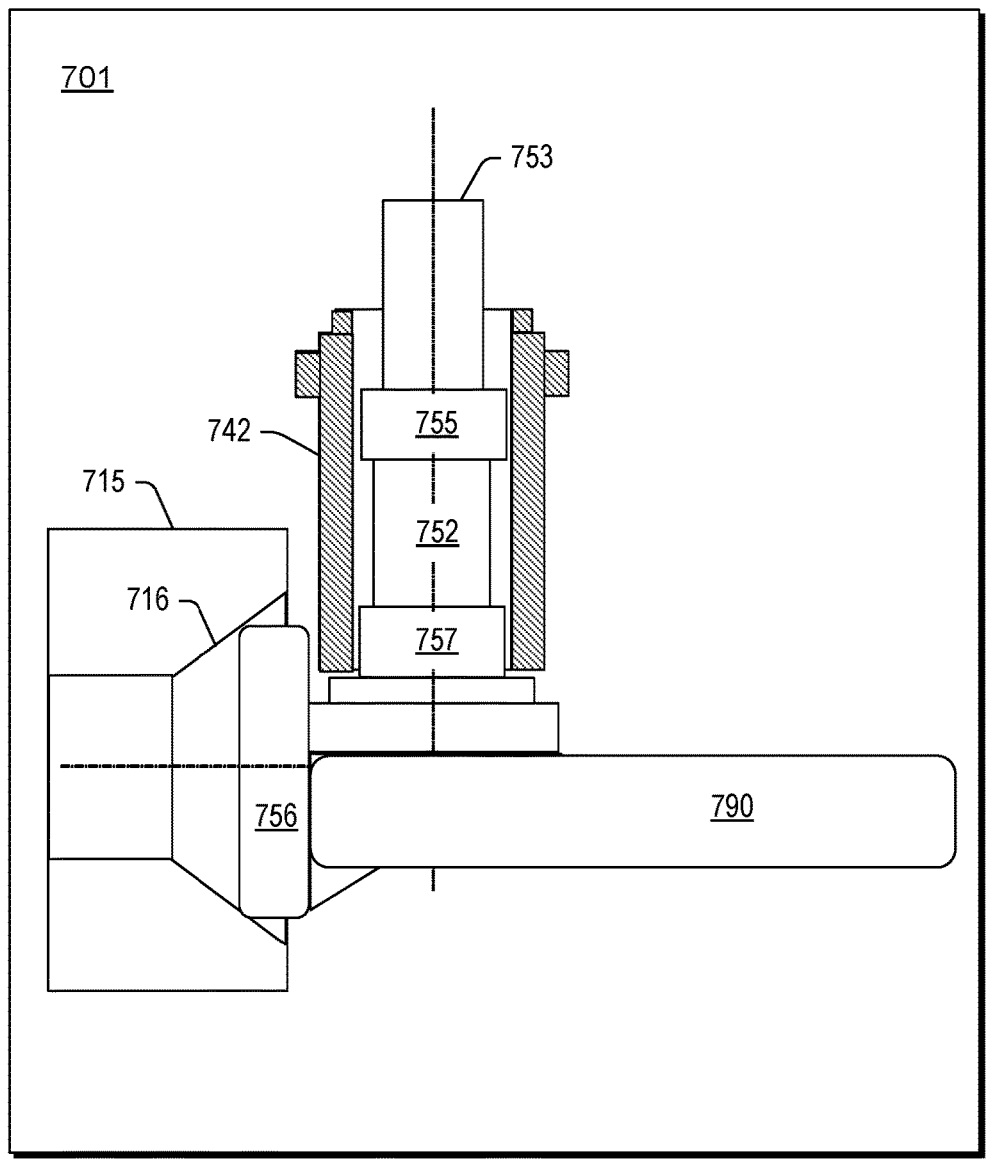
FIG. 8 is an approximate view of an example of an assembly.
Figure 9:
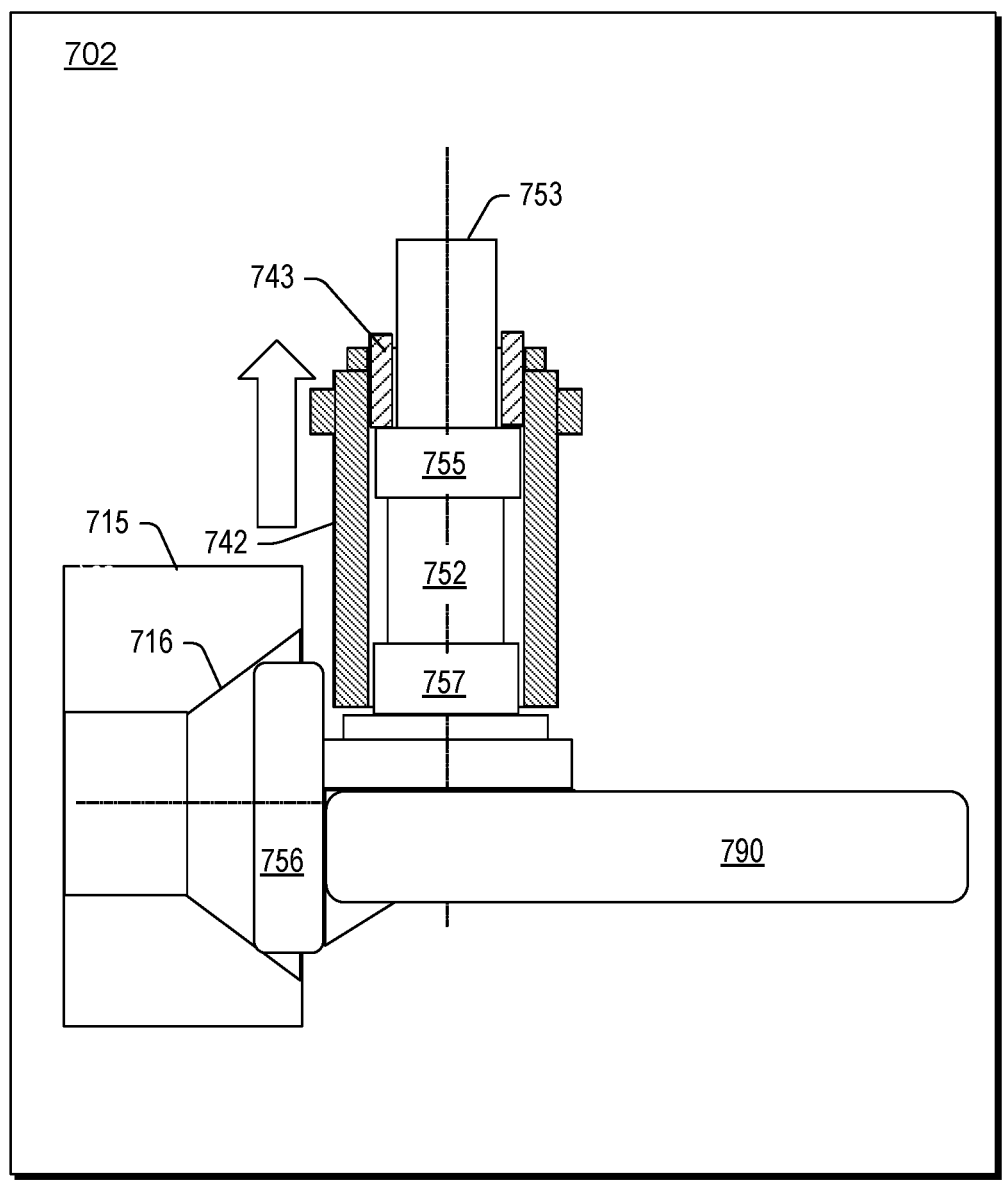
FIG. 9 is an approximate view of an example of an assembly.
Figure 10:
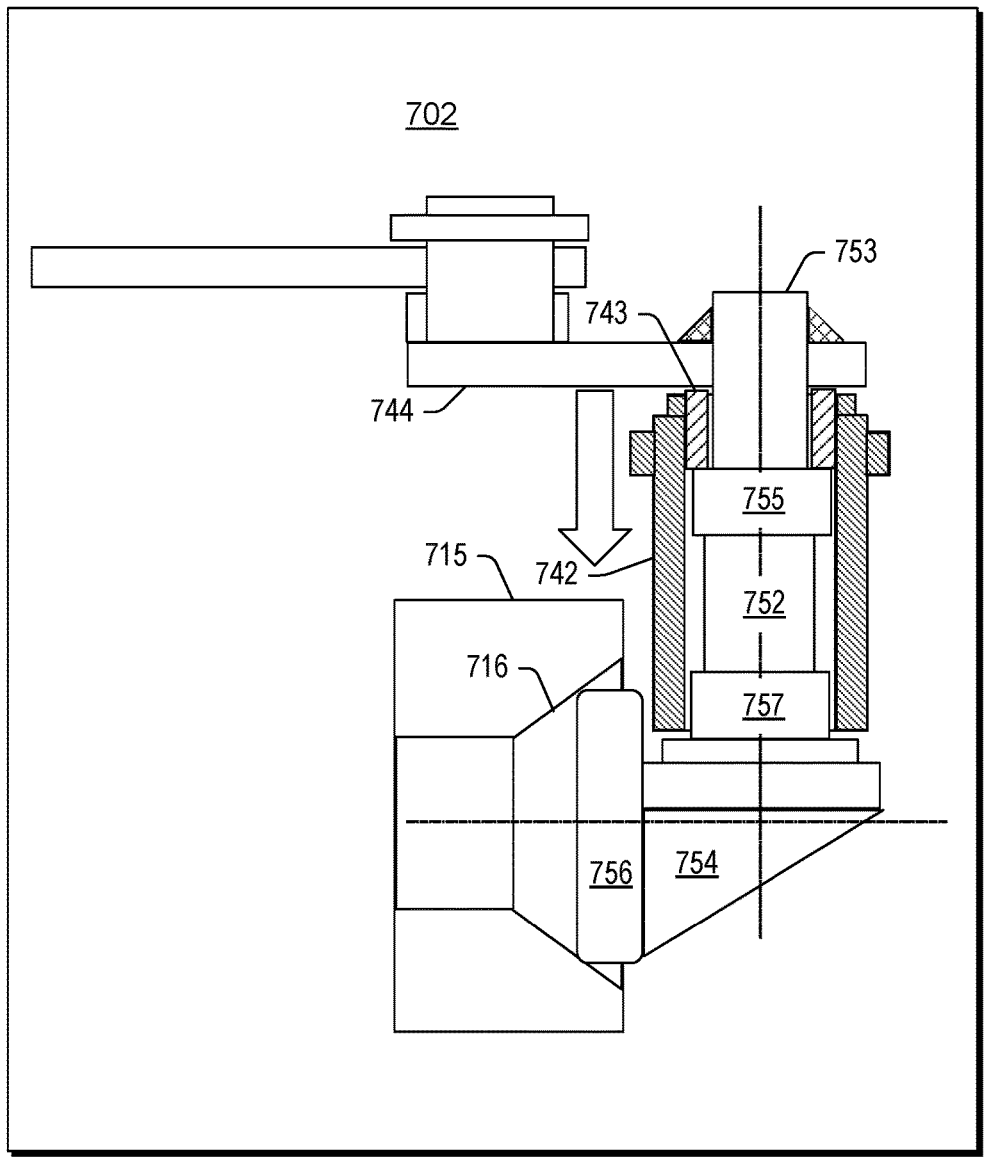
FIG. 10 is an approximate view of an example of an assembly.

FIGS. 8, 9 and 10 show various actions 701, 702 and 703 associated with a method of assembling the assembly 700 of FIG. 7.

FIG. 8 shows a portion of the assembly 700 during an assembly process 701 where a tool 790 applies force to a surface of the plug 756 to orient the plug 756 with respect to the wastegate seat 716.

FIG. 9 shows a portion of the assembly 700 during an assembly process 702 where the tool 790 applies force to a surface of the plug 756 to orient the plug 756 with respect to the wastegate seat 716 and where the axial position of the arm 754 is delimited by inserting the ring 743. As shown, the ring 743 includes a diameter that is less than a diameter of the bushing 742 such that the ring 743 can be inserted axially an axial depth in the bushing 742. In the example of FIG. 9, the ring 743 includes an axial length such that the ring 743 can be seated against a shoulder of the journal 755 and such that the ring 743 can extend past an end of the bushing 742 toward the shaft end 753. As an example, an assembly process can include bringing a ring that is disposed at least in part in a bushing into contact with a shaft shoulder. For example, the tool 790 can apply force to the plug 756 to center the plug 756 with respect to the wastegate seat 716 where the ring 743 may be brought into contact with the journal 755 and then pulled outwardly an axial distance that can be a clearance distance. Once the ring 743 is positioned appropriately (e.g., to achieve an optimal position, an optimal clearance, etc.), the ring 743 may be fixed to the bushing 742 (e.g., via welding). In such an example, the fixed axial position of the ring 743 can delimit movement of the shaft 752 (e.g., and hence the plug 756) in an axially outward direction.

In the example of FIG. 9, a delimiting direction is illustrated which is directed toward the shaft end 753. For example, the ring 743 can be a position limiting ring which is interference fit into the bushing 742 such that the ring 743 applies force to the bushing 742 that can resist axial movement of the ring 743 with respect to the bushing 742. In such an example, movement of the shaft 752 is delimited by contact between the shoulder of the journal 755 and the ring 743. As mentioned, the ring 743 can be welded to the bushing 742. As an example, a ring 743 can be a position limiting ring that can be positioned using an interference fit to the bushing 742 where the ring 743 may welded at that position (e.g., or another deliberately selected position) to the bushing 742.

FIG. 10 shows the assembly 700 during an assembly process 703 where the tool 790 may be used to apply force to a surface of the plug 756 to orient the plug 756 with respect to the wastegate seat 716, where the axial position of the shaft 752 is delimited by the ring 743 (e.g., via contact between the journal 755 and the ring 743), and where the control arm 744 is positioned on the wastegate 750 and welded to the wastegate 750.

As shown in the example of FIG. 10, a delimiting direction is illustrated which is directed toward the arm side of the wastegate 750. In such an example, movement of the shaft 752 is delimited by contact between the control arm 744 and the ring 743, as received at least in part by the bushing 742. As mentioned, the ring 743 can be a position limiting ring that is interference fit at least in part into a bore of the bushing 742 such that the ring 743 can resist axial forces and maintain an axial relationship with respect to the bushing 742. As mentioned, the ring 743 can be welded to the bushing 742 via a welding process that forms a weld that connects the ring 743 and the bushing 742. As mentioned, where a ring can be seated completely in a bore of a bushing and end of the bushing may define a clearance with respect to a surface of a control arm such that the end of the bushing delimits axial movement of the control arm and shaft to which the control arm is welded (e.g., or otherwise connected).

Figure 12:
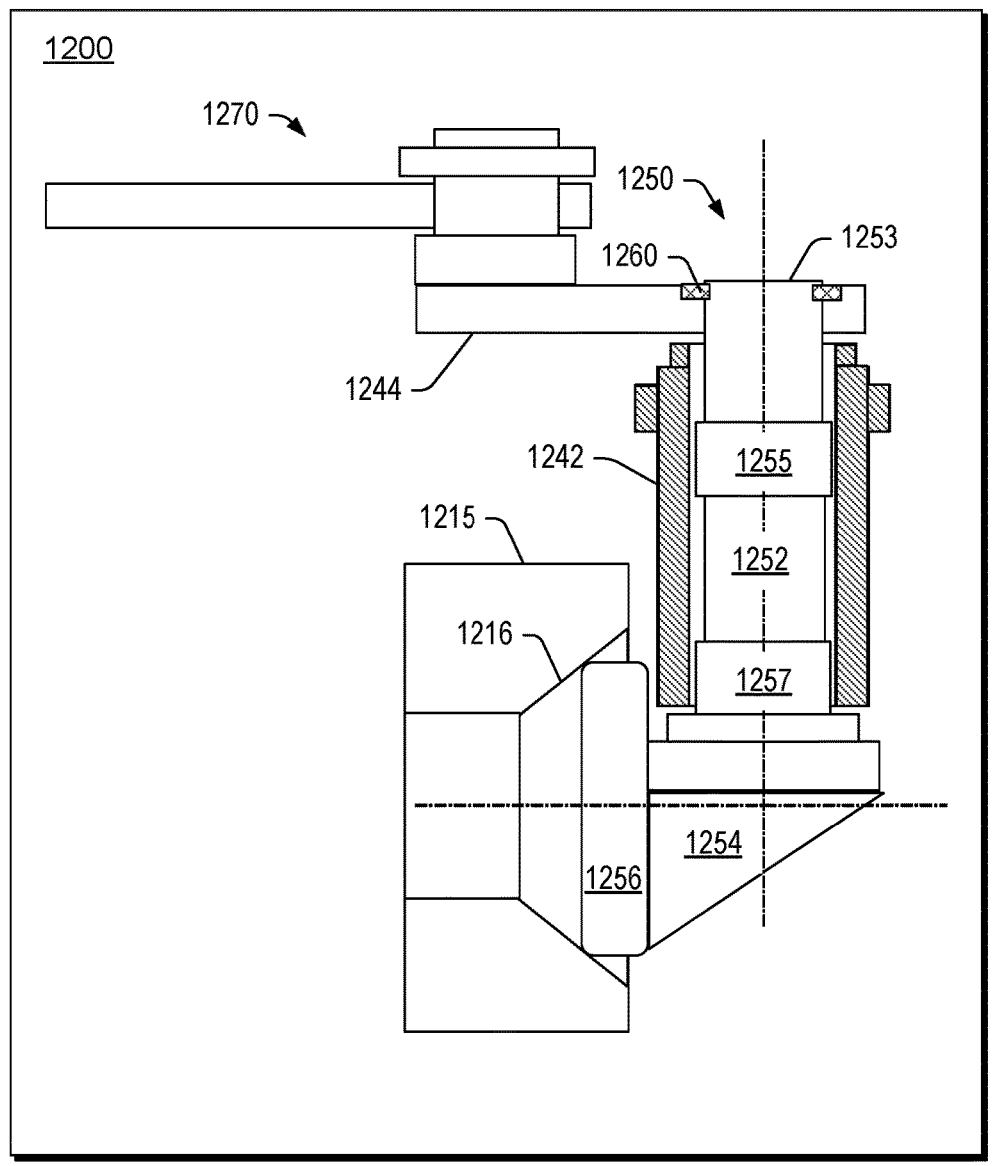
FIG. 12 is an approximate view of an example of an assembly.
Figure 13:
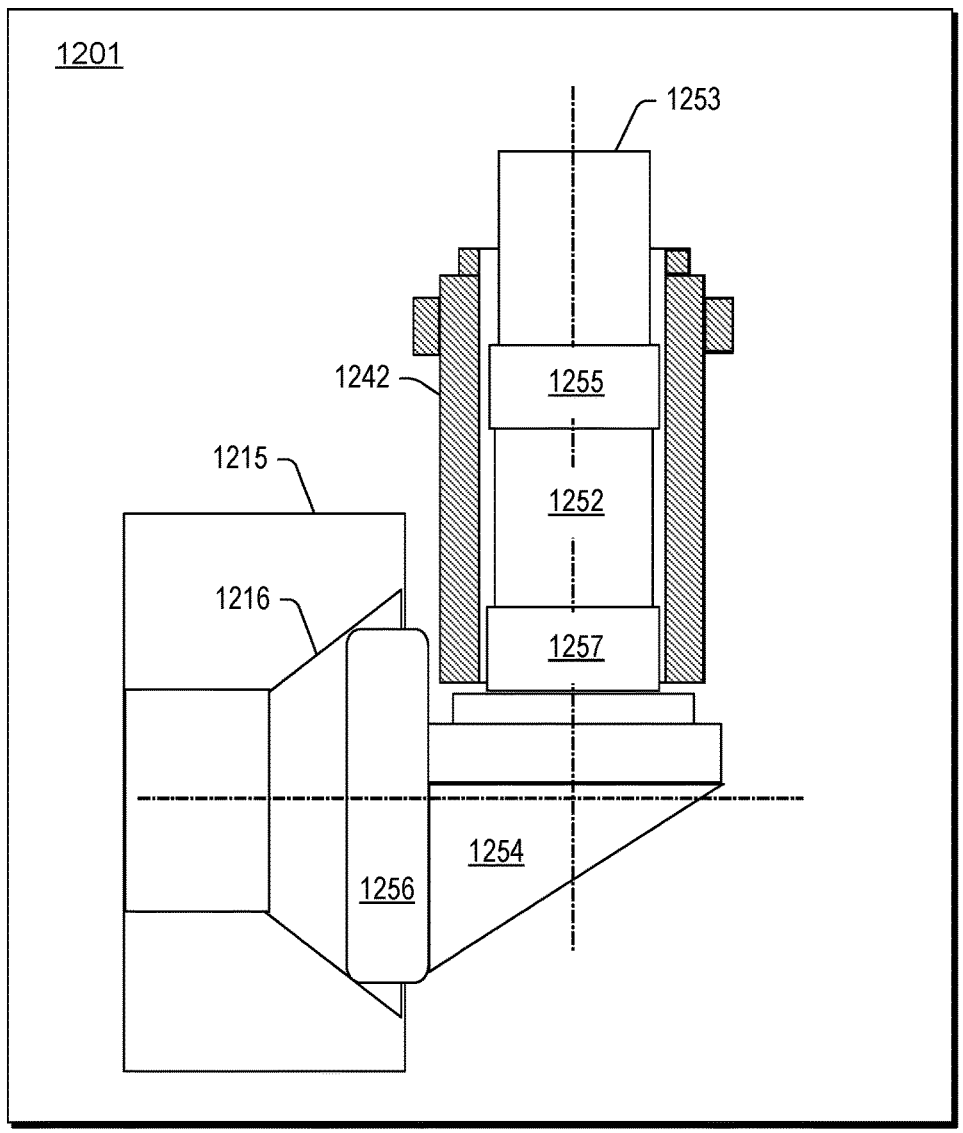
FIG. 13 is an approximate view of an example of an assembly.
Figure 14:
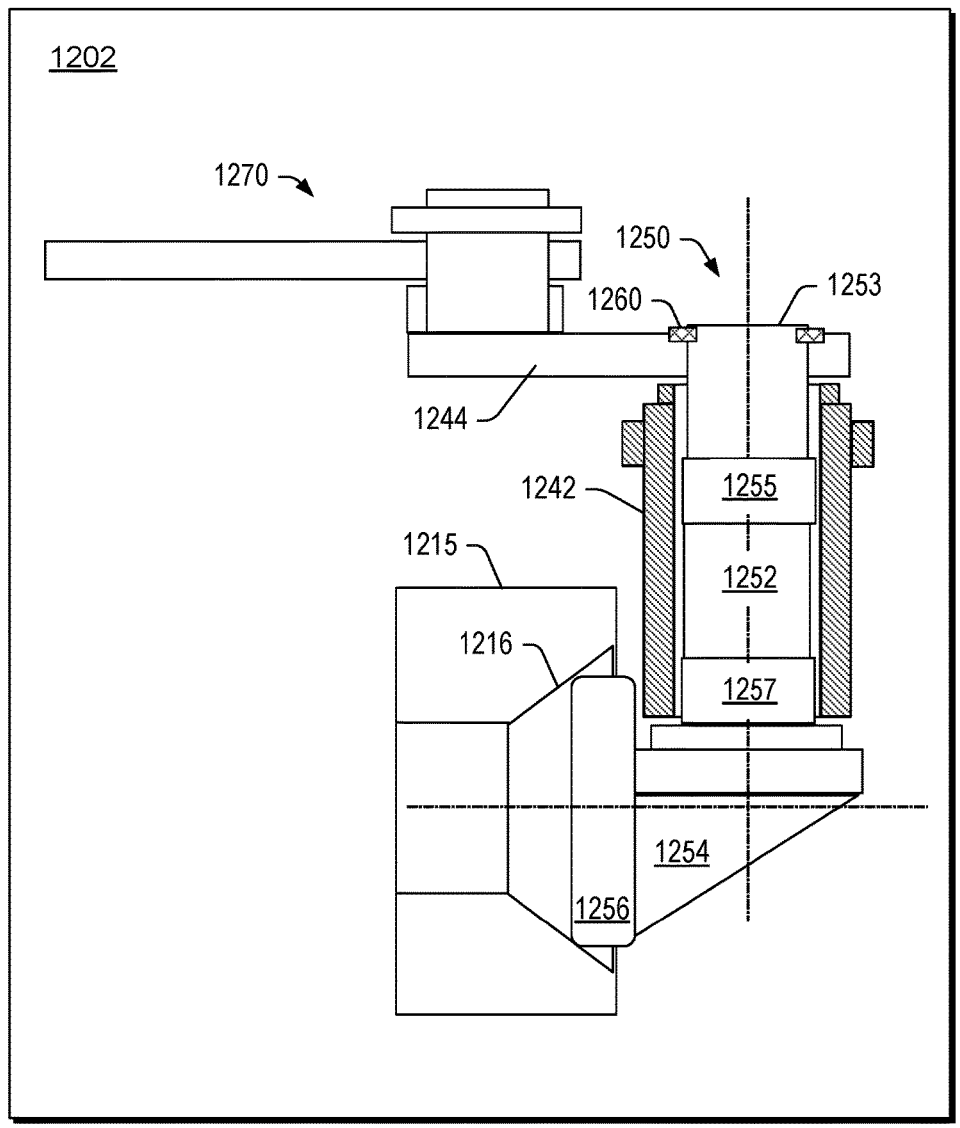
FIG. 14 is an approximate view of an example of an assembly.
Figure 15:
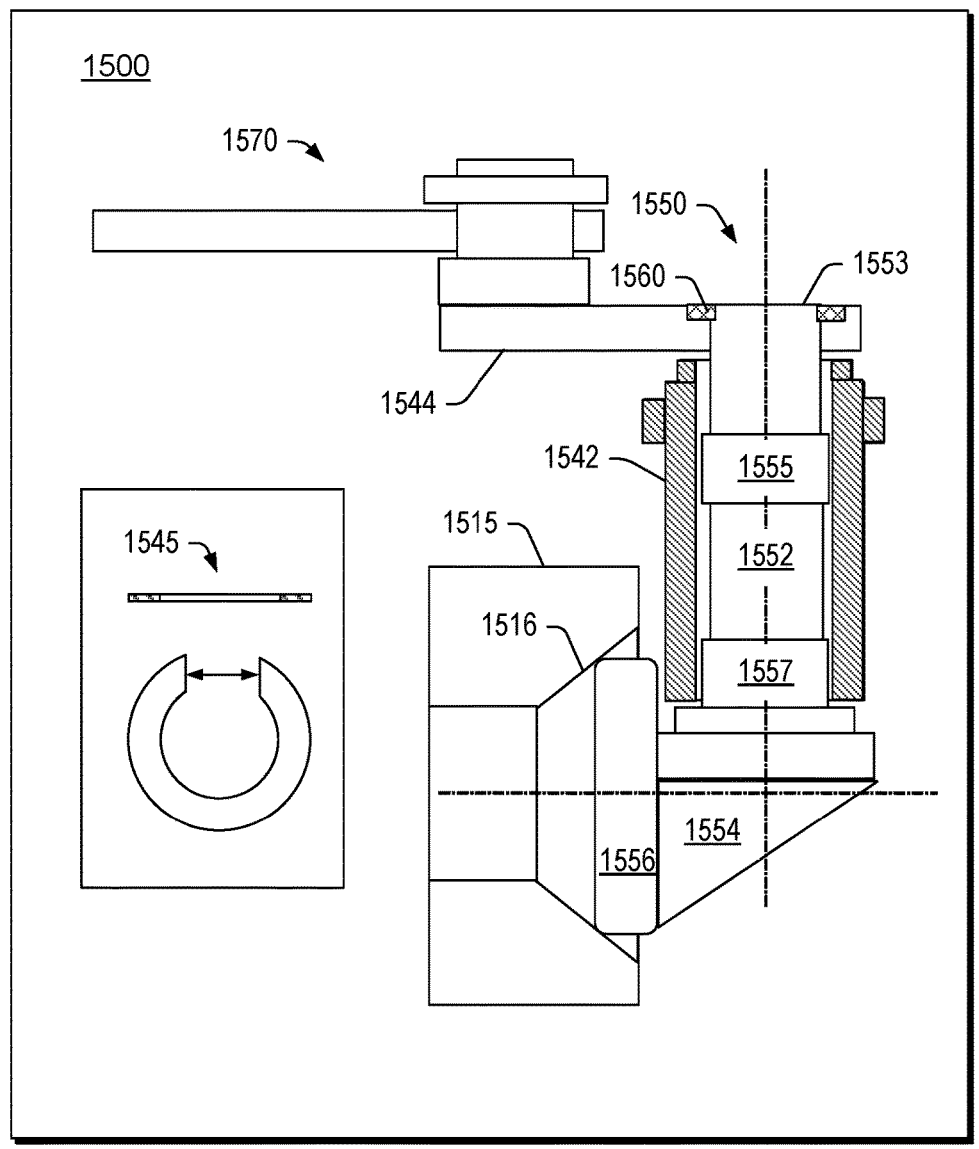
FIG. 15 is an approximate view of an example of an assembly.
Figure 16:
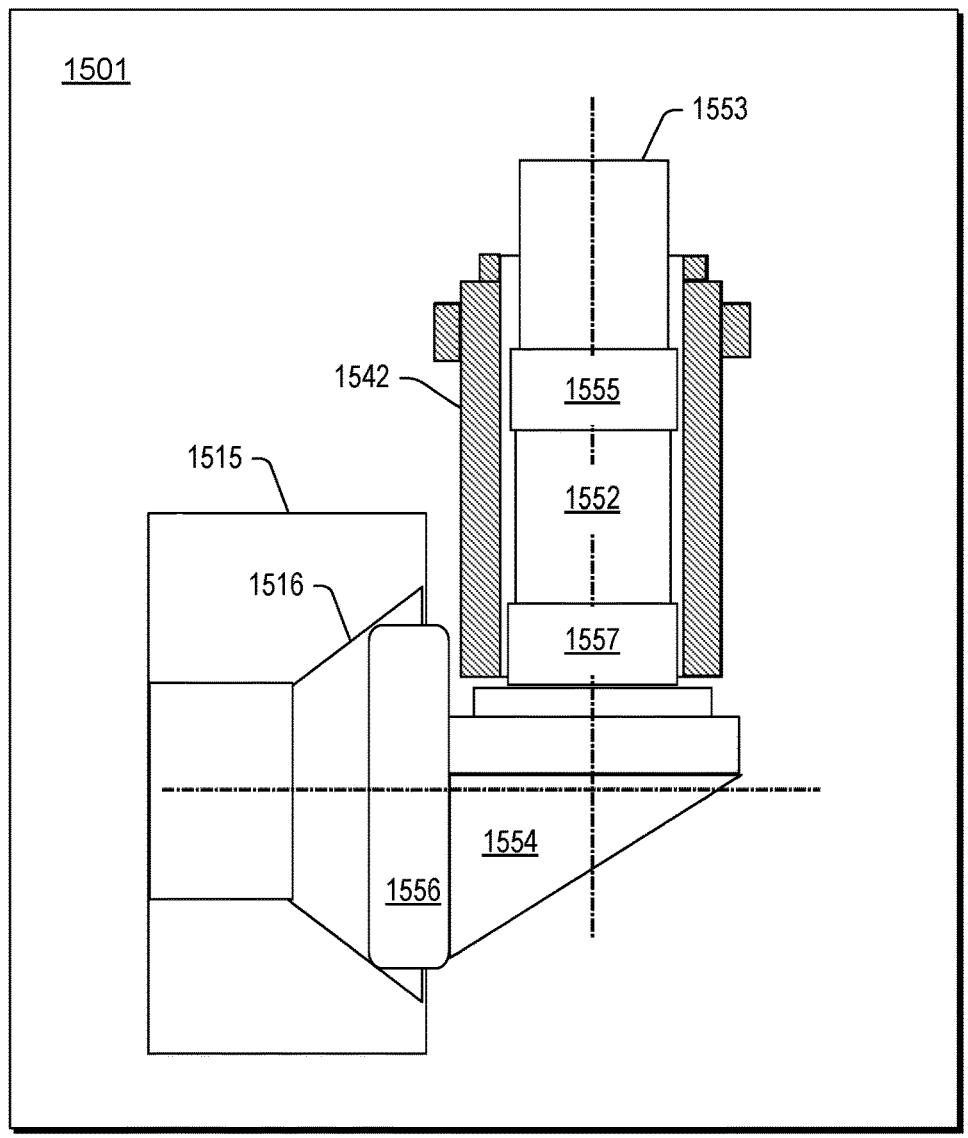
FIG. 16 is an approximate view of an example of an assembly.
Figure 17:
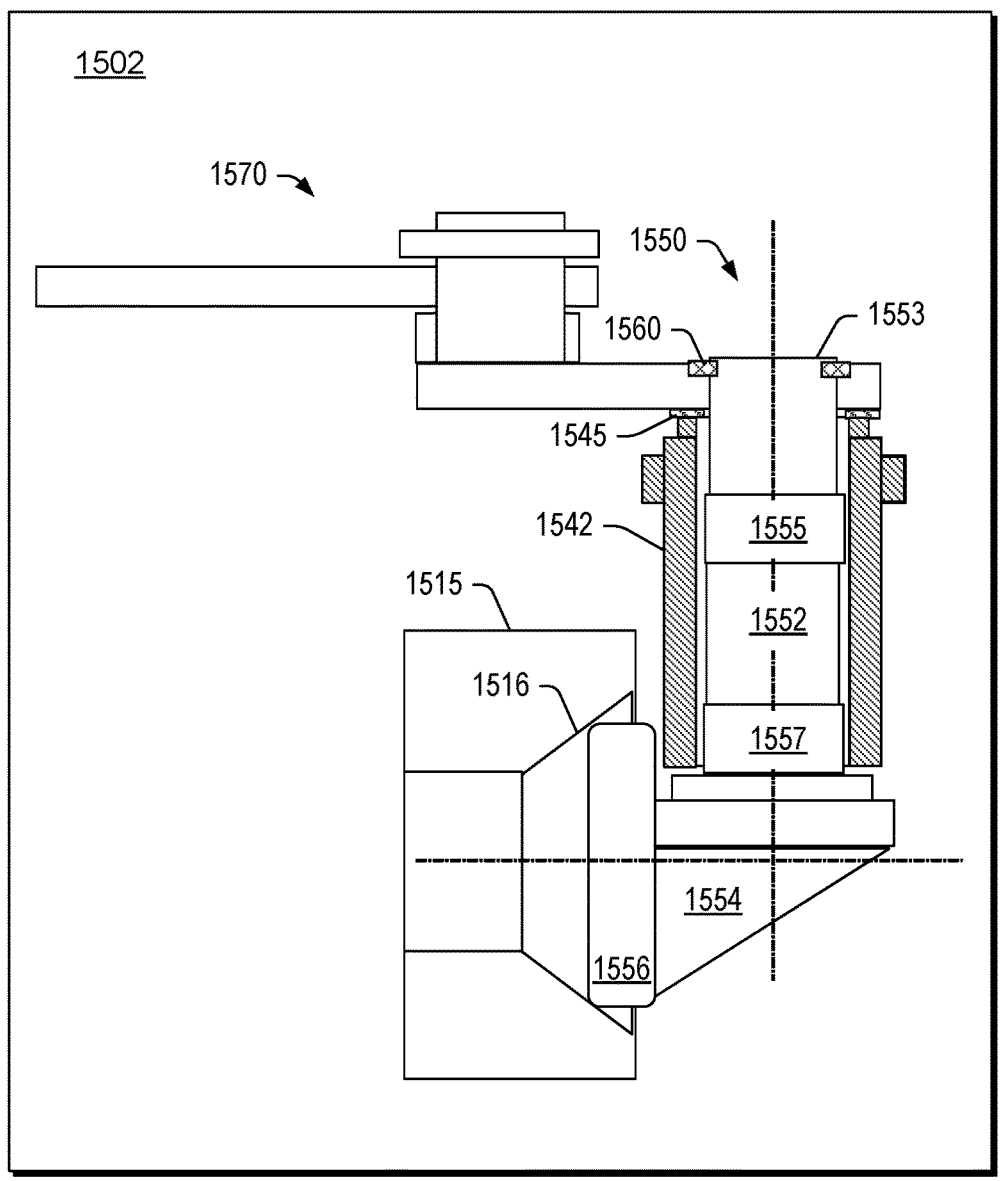
FIG. 17 is an approximate view of an example of an assembly.

FIG. 11 shows a block diagram that includes a block as to an example assembly 1200 as illustrated with respect to FIGS. 12, 13 and 14; a block as to an example assembly 1500 as illustrated with respect to FIGS. 15, 16 and 17; a block as to an example assembly 1800 as illustrated with respect to FIGS. 18, 19, 20 and 21; and a block as to an example assembly 2200 as illustrated with respect to FIGS. 22, 23, 24 and 25.

FIG. 12 shows an example of an assembly 1200 that includes a housing 1215 that defines a wastegate seat 1216, a bushing 1242, a control arm 1244, a wastegate 1250, a weld 1260, and a control linkage 1270 operatively coupled to the control arm 1244. As shown, the wastegate 1250 includes a shaft 1252, a shaft end 1253, an arm 1254 and a plug 1256 where the shaft 1252 can include one or more journals 1255 and 1257. As shown in the example of FIG. 12, the journal 1255 is a control arm side journal and the journal 1257 is an arm side journal.

FIGS. 13 and 14 show various actions 1201 and 1202 associated with a method of assembling the assembly 1200 of FIG. 12.

FIG. 13 shows a portion of the assembly 1200 during an assembly process 1201 where the wastegate 1250 is positioned with respect to the wastegate seat 1216.

FIG. 14 shows a portion of the assembly 1200 during an assembly process 1202 where the wastegate 1250 is positioned with respect to the wastegate seat 1216 and where the weld 1260 is formed to operatively couple the control arm 1244 to the wastegate 1250.

In the example of FIG. 14, the weld 1260 can provide for fusion between a portion of the wastegate 1250 and a portion of the control arm 1244. As an example, a penetration depth of the weld 1260 may be of the order of about 1 mm (e.g., about 0.1 mm to about 2 mm). In the example of FIG. 14, a clearance can exist between the bushing 1242 and a surface of the control arm 1244 where the clearance may be of the order of about a tenth of a millimeter (e.g., or less).

As an example, a method can include positioning a control arm with respect to a wastegate, securing an optimal position of the control arm to the wastegate (e.g., to achieve perpendicularity), securing an optimal position of a bushing (e.g., with a maximum clearance of about 0.1 mm) and holding and maintaining the optimal position and clearance to the bushing before and during welding. In such an example, the weld formed via welding can secure the control arm to the wastegate.

In the example assembly 1200 of FIG. 12 and FIG. 14, the wastegate 1250 can translate axially inwardly and outwardly where a portion of the arm 1254 can contact an end of the bushing 1242 to delimit outward movement and where a surface of the control arm 1244 can contact an opposing end of the bushing 1242 to delimit inward movement. In such an example, a clearance can exist at either end of the bushing 1242 or clearances can exist at both ends of the bushing 1242. Such clearances may be sufficiently large such that movement of the wastegate 1250 may result in misalignment of the plug 1256 with respect to the wastegate seat 1216. As an example, a method or methods may be employed to selectively determine one or more positions and/or one or more clearances during assembly such that a risk of misalignment of a plug with respect to a wastegate seat is reduced.

FIG. 15 shows an example of an assembly 1500 that includes a housing 1515 that defines a wastegate seat 1516, a bushing 1542, a control arm 1544, a shim 1545, a wastegate 1550, a weld 1560, and a control linkage 1570 operatively coupled to the control arm 1544. As shown, the wastegate 1550 includes a shaft 1552, a shaft end 1553, an arm 1554 and a plug 1556 where the shaft 1552 can include one or more journals 1555 and 1557. As shown in the example of FIG. 15, the journal 1555 is a control arm side journal and the journal 1557 is an arm side journal.

In the example of FIG. 15, the shim 1545 can be disposed at least in part axially between a surface of the control arm 1544 and the bushing 1542. In such an example, the shim 1545 can act as an axial spacer between the control arm 1544 and the bushing 1542. As an example, the shim 1545 can be substantially C shaped, substantially U shaped or another suitable shape. As shown in FIG. 15, a substantially C shaped shim can include a gap that is sufficient to position the shim about at least a portion of the shaft 1552 of the wastegate 1550. Such a shim can be removable, for example, utilized during assembly, particularly during a welding process. As an example, such a shim may be utilized during manufacture, shipping, etc. of a turbocharger or a portion thereof and then removed prior to operation of the turbocharger.

FIGS. 16 and 17 show various actions 1501 and 1502 associated with a method of assembling the assembly 1500 of FIG. 15.

FIG. 16 shows a portion of the assembly 1500 during an assembly process 1501 where the wastegate 1550 is positioned with respect to the wastegate seat 1516.

FIG. 17 shows a portion of the assembly 1500 during an assembly process 1502 where the wastegate 1550 is positioned with respect to the wastegate seat 1516, where the shim 1545 is disposed about the shaft 1552 at an axial position between the journal 1555 and the shaft end 1553 where the axial position is between an end of the bushing 1542 and a surface of the control arm 1544 and where the weld 1560 is formed to operatively couple the control arm 1544 to the wastegate 1550. In the example of FIG. 17, the shim 1545 may be removed after welding that forms the weld 1560.

As an example, a method can include positioning a shaft of a wastegate with respect to a bushing and securing a centering position of the wastegate via a plug of the wastegate being seated with respect to a wastegate seat where a surface of an arm of the wastegate is delimited by a surface of the bushing.

In such an example, the method can include positioning a shim about a portion of the shaft and positioning a control arm with respect to the shaft about a portion of the shaft that extends past an end of the bushing where the shim is disposed between the end of the bushing and a surface of the control arm. In such an example, the method can include securing the control arm at an optimal position with respect to the wastegate (e.g., perpendicularity) as well as securing an optimal position of the control arm to the bushing (e.g., consider a maximum clearance of approximately 0.1 mm) and maintaining the optimal positioning at least during welding to form a weld that connects the control arm to the wastegate. After formation of the weld, the shim can be a removable shim that can be removed from between the control arm and the bushing.

As an example, a shim may be a substantially C shaped shim, a substantially U shaped shim, etc., that can be inserted to partially surround a portion of a shaft of a wastegate where the shim is disposed between a bushing and a control arm.

As an example, a shim may be a full 360 degree shim where the shim may be made of a material that can be broken, cut, etc. to remove the shim after use (e.g., use during a welding process, etc.).

Figure 18:
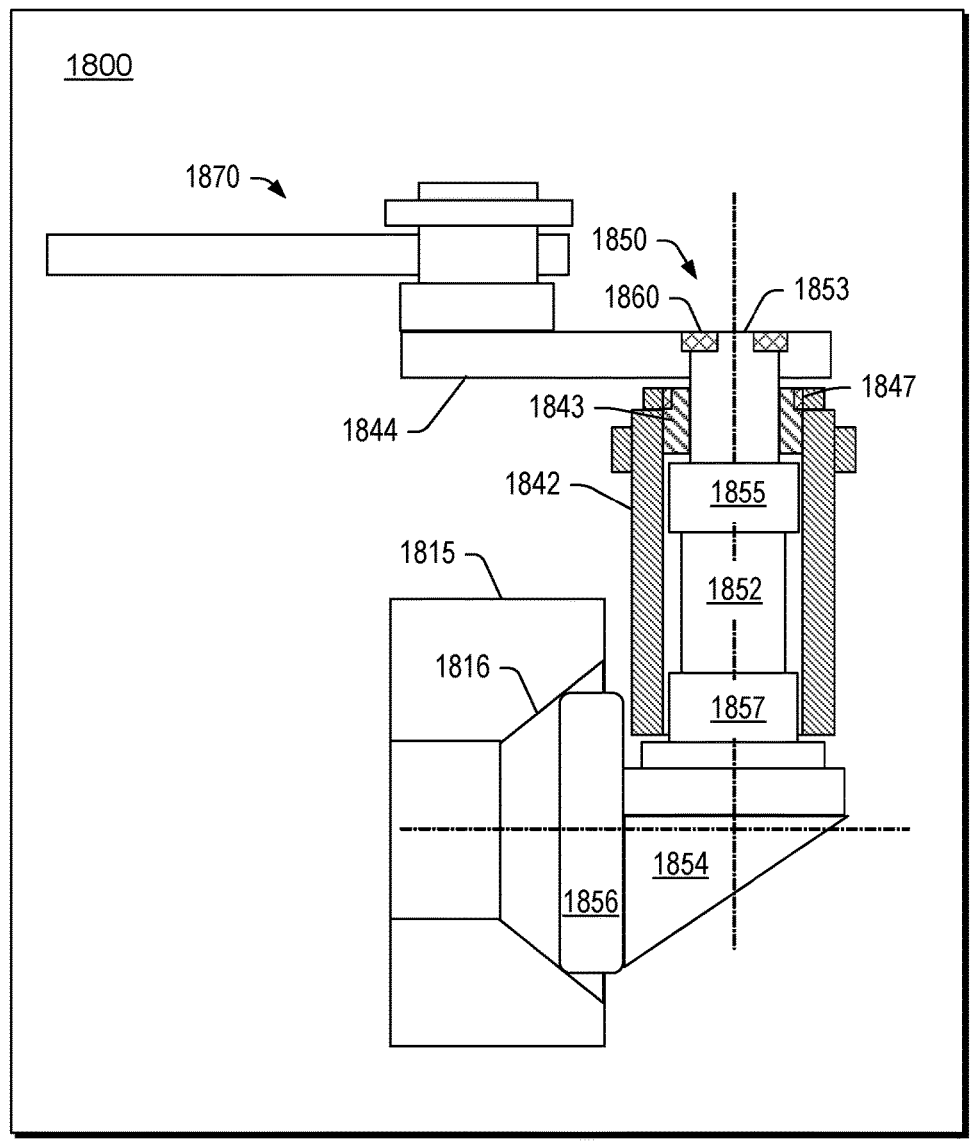
FIG. 18 is an approximate view of an example of an assembly.

FIG. 18 shows an example of an assembly 1800 that includes a housing 1815 that defines a wastegate seat 1816, a bushing 1842, a ring 1843, a control arm 1844, a ring weld 1847, a wastegate 1850, a weld 1860, and a control linkage 1870 operatively coupled to the control arm 1844. As shown, the wastegate 1850 includes a shaft 1852, a shaft end 1853, an arm 1854 and a plug 1856 where the shaft 1852 can include one or more journals 1855 and 1857. As shown in the example of FIG. 18, the journal 1855 is a control arm side journal and the journal 1857 is an arm side journal.

In the example of FIG. 18, the ring 1843 can be disposed at least in part axially in the bushing 1842 and between a surface of the control arm 1844 and the journal 1855 of the shaft 1852. In such an example, the ring 1843 can act as an axial spacer between the control arm 1844 and the journal 1855 of the shaft 1852. As an example, the ring 1843 can be welded via the ring weld 1847 to connect the ring 1843 to the bushing 1842. In such an example, the ring 1843 can be fixed to the bushing 1842. In such an example, one end of the ring 1843 can be disposed a distance from the journal 1855 and another, opposing end of the ring 1843 can be disposed a distance from a surface of the control arm 1844.

As an example, the weld 1860 may be spotted, segmented, continuous, etc. As an example, of 360 degrees about the shaft 1852, the weld 1860 may be a total in a range from about 270 degrees to about 360 degrees (e.g., including 360 degrees). As an example, a series of spots may be welded over a total range of about 360 degrees. As an example, a continuous weld may be welded over a total range of about 360 degrees.

In the example of FIG. 18, a clearance can exist between the ring 1843 and a surface of the control arm 1844. As an example, such a clearance may be of the order of about 0.1 mm or less (e.g., consider a clearance of the order of about 0.05 mm or less).

Figure 19:
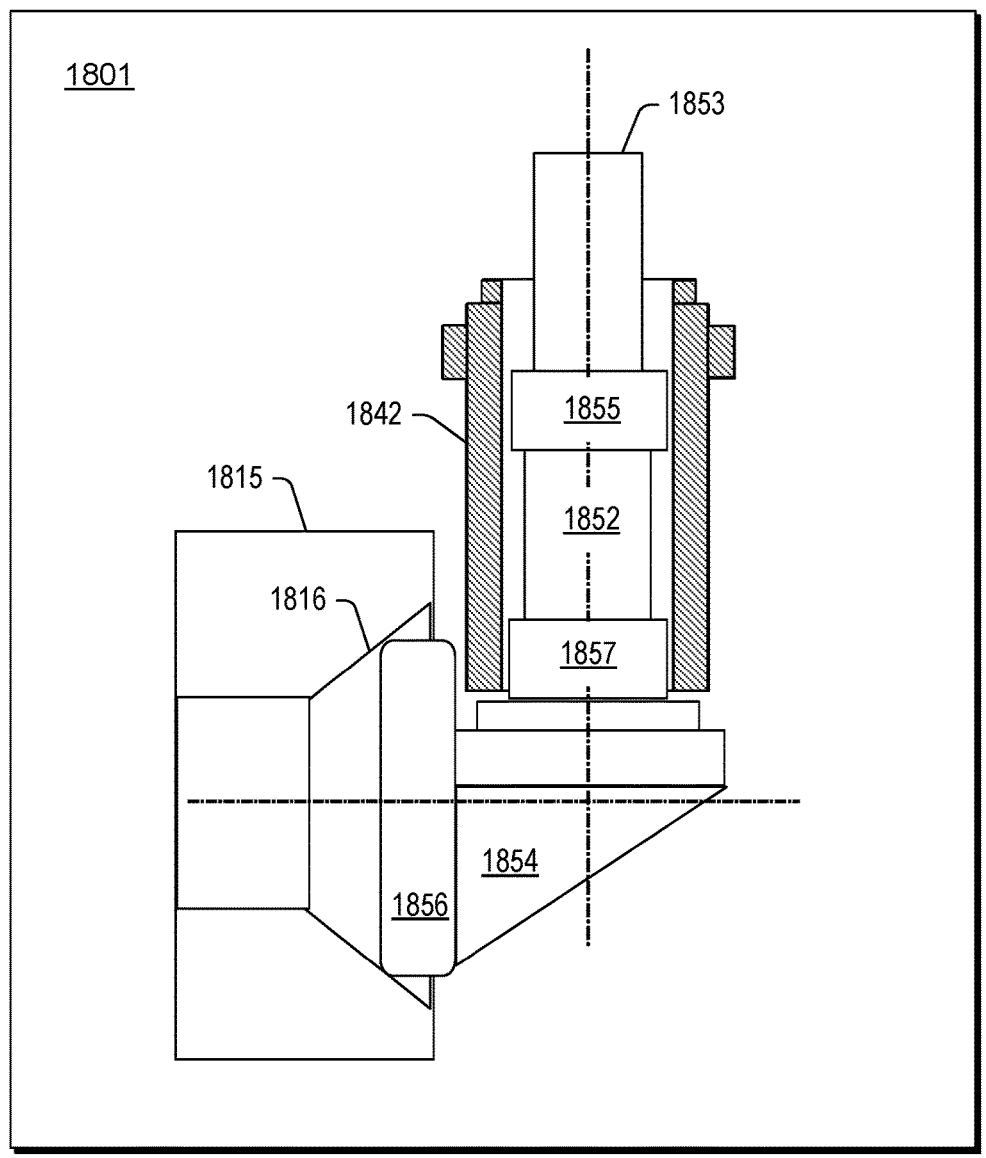
FIG. 19 is an approximate view of an example of an assembly.
Figure 20:
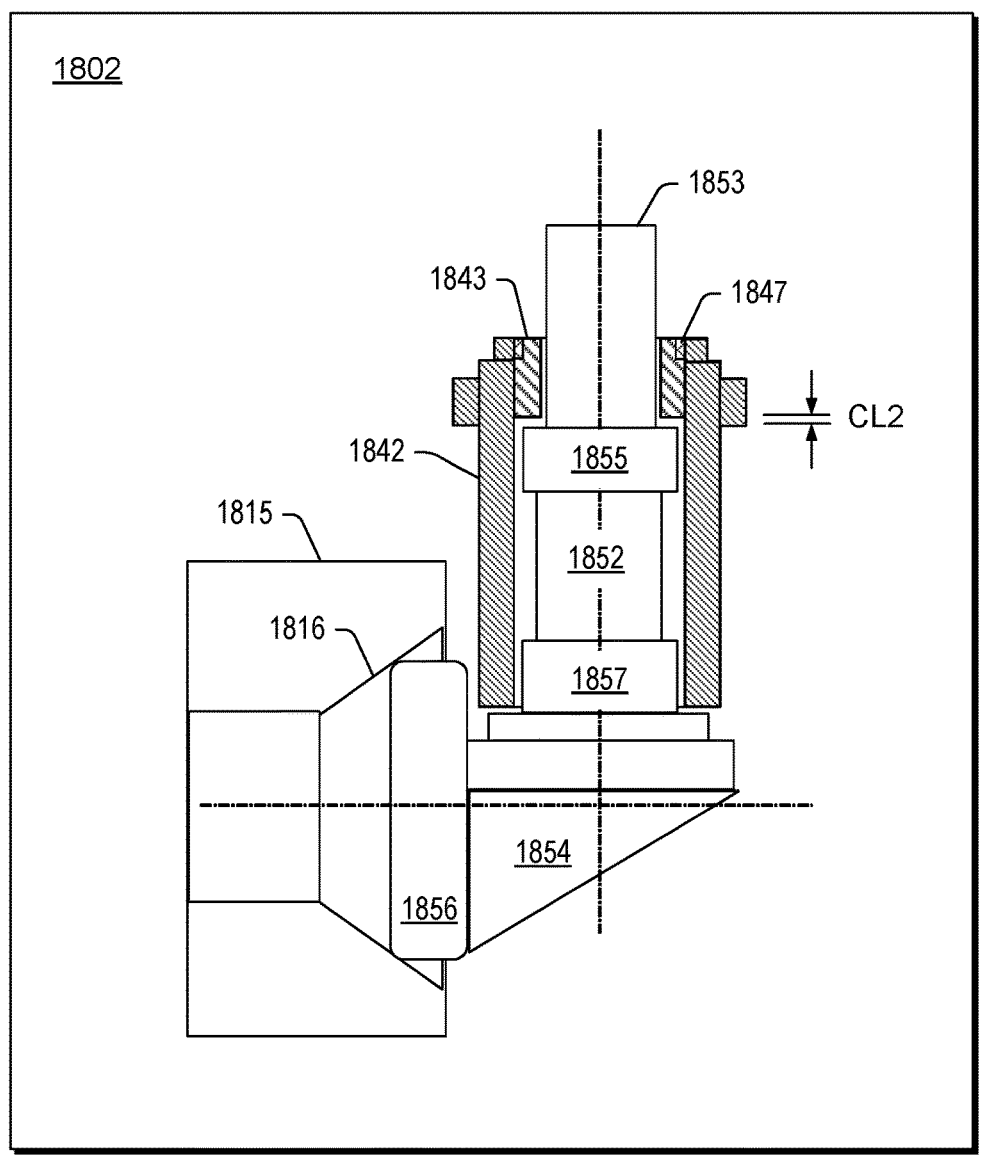
FIG. 20 is an approximate view of an example of an assembly.
Figure 21:
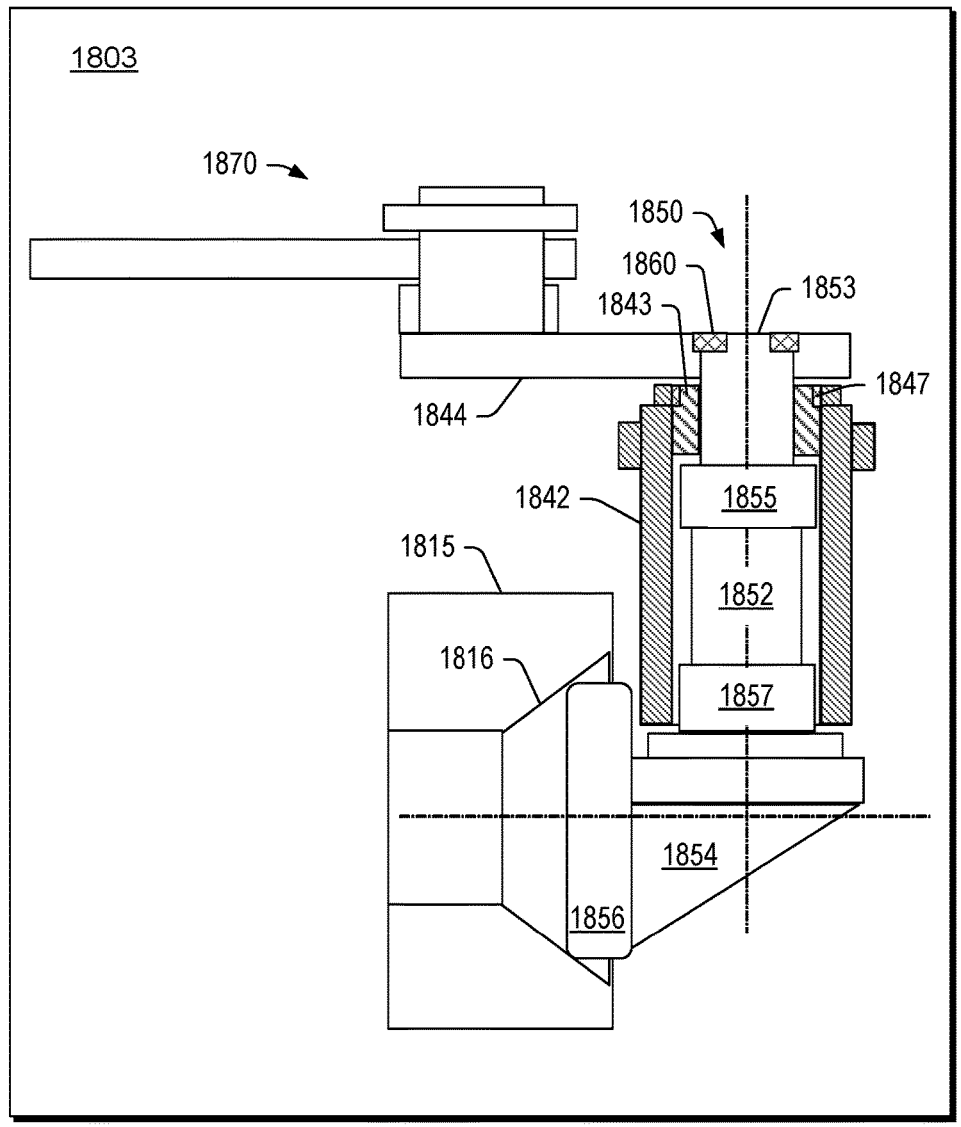
FIG. 21 is an approximate view of an example of an assembly.

FIGS. 19, 20 and 21 show various actions 1801, 1802 and 1803 associated with a method of assembling the assembly 1800 of FIG. 18.

FIG. 19 shows a portion of the assembly 1800 during an assembly process 1801 where the wastegate 1850 is positioned with respect to the wastegate seat 1816 and where the shaft 1852 passes through a bore of the bushing 1842, which can be seated in a bore of the housing 1815 (see, e.g., FIG. 6).

As an example, a method can include positioning the wastegate 1850 with respect to the bushing 1842 and securing a centering position of the plug 1856 of the wastegate 1850 with respect to the wastegate seat 1816 and, for example, a shoulder of the arm 1854 of the wastegate 1850 with respect to the bushing 1842. In such an example, a tool, a jig, etc. may be utilized to block and hold wastegate 1850 at the desired position.

FIG. 20 shows a portion of the assembly 1800 during an assembly process 1802 where the wastegate 1850 is positioned with respect to the wastegate seat 1816 and where the shaft 1852 passes through a bore of the bushing 1842, which can be seated in a bore of the housing 1815 (see, e.g., FIG. 6).

As shown in FIG. 20, a method can include inserting the ring 1843 at least in part in a bore of the bushing 1842 where an end of the ring 1843 is disposed a distance (e.g., CL2, see also, e.g., CL2 of FIG. 6) from the journal 1855 of the shaft 1852 of the wastegate 1850. In such an example, the method can include fixing the ring 1843 to the bushing 1842 to fix the distance. For example, consider welding the ring 1843 to the bushing 1842 to fix the distance. As an example, the distance may be of the order of approximately 0.1 mm or less (e.g., consider a distance of approximately 0.05 mm or less). For example, in FIG. 20, the clearance CL4 may be of the order of approximately 0.1 mm or less, which may depend on size of the wastegate 1850.

As an example, a method can include inserting a ring about a portion of a shaft of a wastegate and at least in part within a bore of a bushing, securing an optimal position of the ring with respect to the bushing, and fixing the ring to the bushing to fix the ring position with respect to the bushing. For example, consider welding the ring to the bushing to fix the ring position with respect to the bushing. As an example, the ring can be positioned with respect to an end of the bushing such that a clearance can be defined with respect to the ring and/or the bushing and a surface of a control arm, which can be, for example, welded to the shaft of that wastegate.

FIG. 21 shows a portion of the assembly 1800 during an assembly process 1803 where the wastegate 1850 is positioned with respect to the wastegate seat 1816 and where the shaft 1852 passes through a bore of the bushing 1842, which can be seated in a bore of the housing 1815 (see, e.g., FIG. 6). As shown, the ring weld 1847 connects the ring 1843 to the bushing 1842 to fix the axial position of the ring 1843 with respect to the bushing 1842.

In the example of FIG. 21, the assembly process 1803 includes welding the control arm 1844 to a portion of the shaft 1852 of the wastegate 1850. Such a process allows for control of the plug 1856 of the wastegate 1850 via application of force to the control arm 1844, for example, via the control linkage 1870. In such an example, the wastegate 1850 can rotate to move the plug 1856 either toward the wastegate seat 1816 or away from the wastegate seat 1816.

Figure 22:
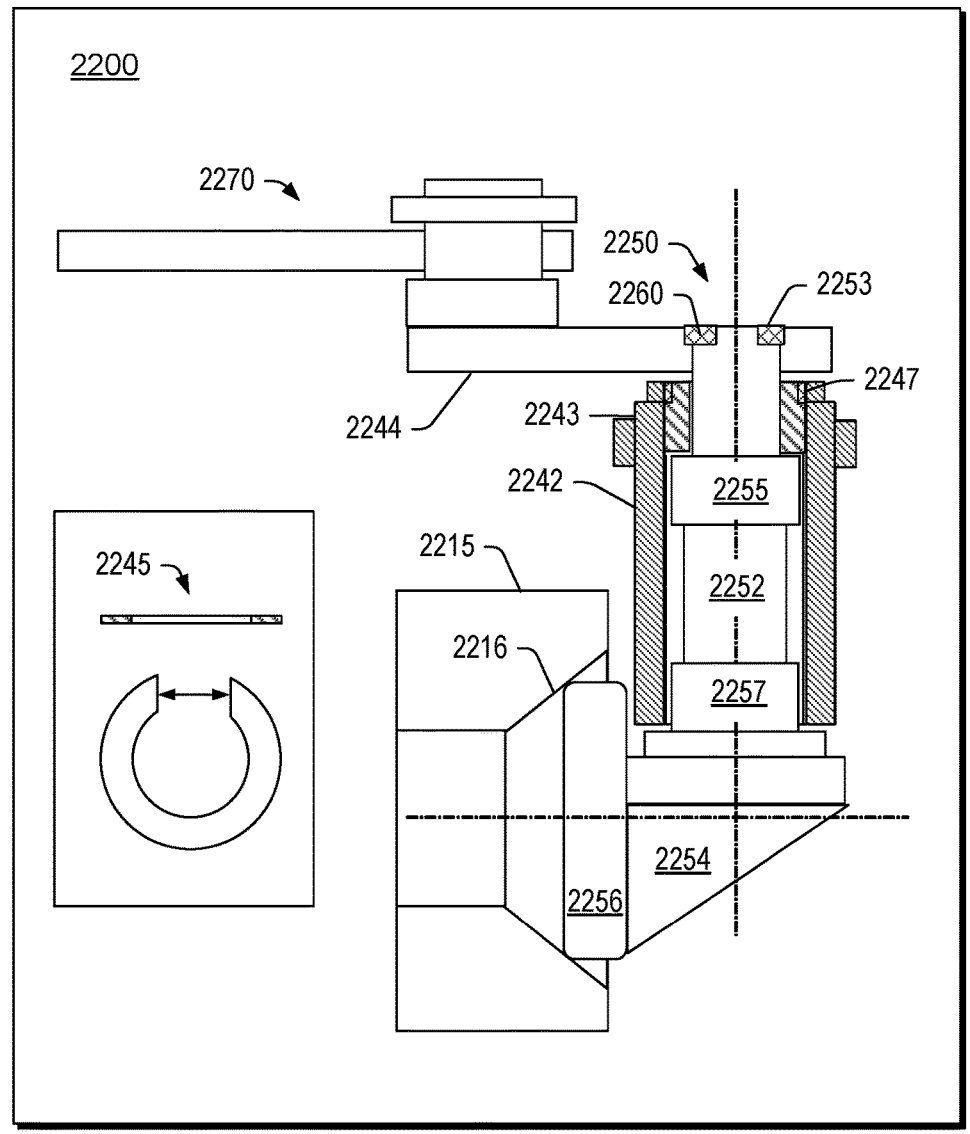
FIG. 22 is an approximate view of an example of an assembly.

FIG. 22 shows an example of an assembly 2200 that includes a housing 2215 that defines a wastegate seat 2216, a bushing 2242, a ring 2243, a control arm 2244, a shim 2245, a ring weld 2247, a wastegate 2250, a weld 2260, and a control linkage 2270 operatively coupled to the control arm 2244. As shown, the wastegate 2250 includes a shaft 2252, a shaft end 2253, an arm 2254 and a plug 2256 where the shaft 2252 can include one or more journals 2255 and 2257. As shown in the example of FIG. 22, the journal 2255 is a control arm side journal and the journal 2257 is an arm side journal.

In the example of FIG. 22, the shim 2245 can be disposed at least in part axially between a surface of the control arm 2244 and the bushing 2242. In such an example, the shim 2245 can act as an axial spacer between the control arm 2244 and the bushing 2242. As an example, the shim 2245 can be substantially C shaped, substantially U shaped or another suitable shape. As shown in FIG. 22, a substantially C shaped shim can include a gap that is sufficient to position the shim about at least a portion of the shaft 2252 of the wastegate 2250. Such a shim can be removable, for example, utilized during assembly, particularly during a welding process. As an example, such a shim may be utilized during manufacture, shipping, etc. of a turbocharger or a portion thereof and then removed prior to operation of the turbocharger.

In the example of FIG. 22, the ring 2243 can be disposed at least in part axially in the bushing 2242 and between a surface of the control arm 2244 and the journal 2255 of the shaft 2252. In such an example, the ring 2243 can act as an axial spacer between the control arm 2244 and the journal 2255 of the shaft 2252. As an example, the ring 2243 can be welded via the ring weld 2247 to connect the ring 2243 to the bushing 2242. In such an example, the ring 2243 can be fixed to the bushing 2242 such that the axial position of the ring 2243 is fixed with respect to the bushing 1842. In such an example, one end of the ring 2243 can be disposed a distance from the journal 2255 and another, opposing end of the ring 2243 can be disposed a distance from a surface of the control arm 2244.

Figure 23:
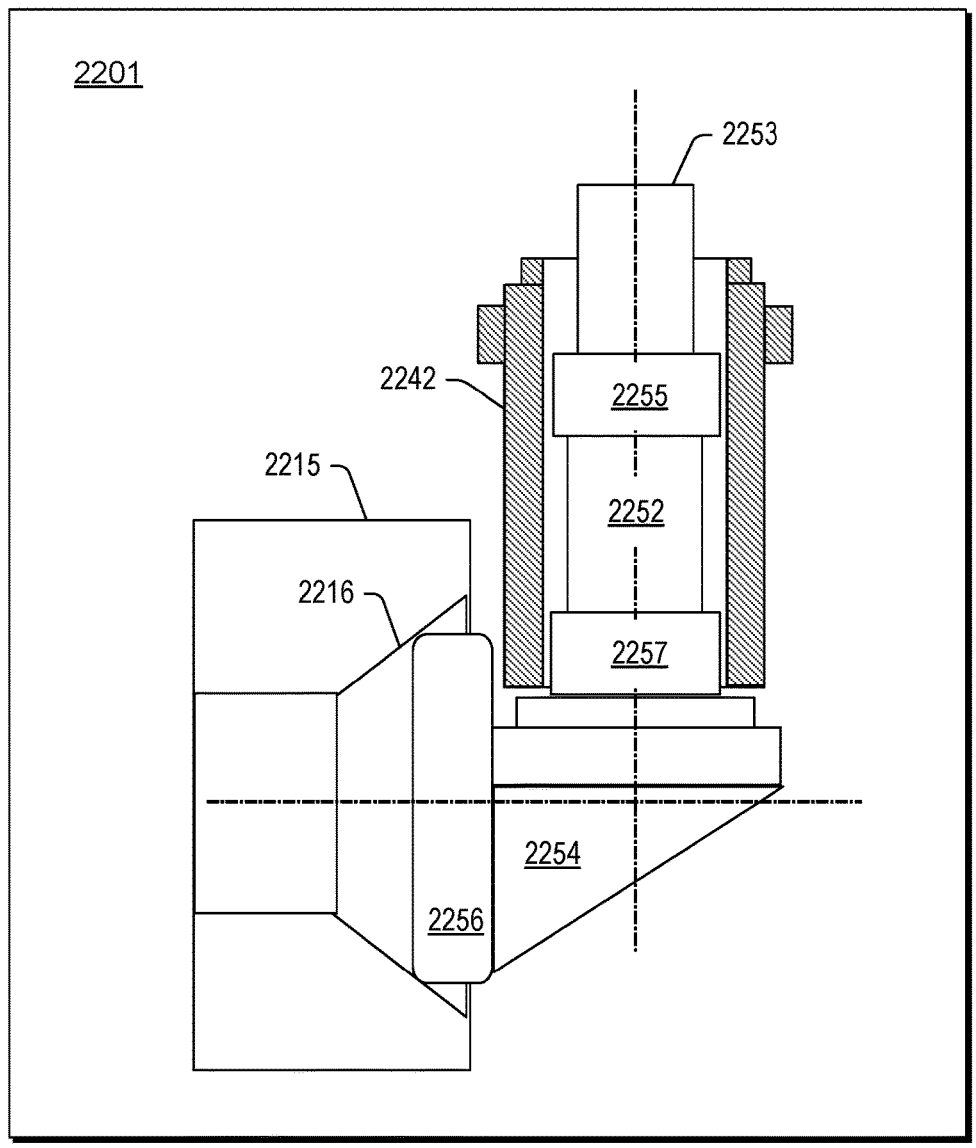
FIG. 23 is an approximate view of an example of an assembly.
Figure 24:
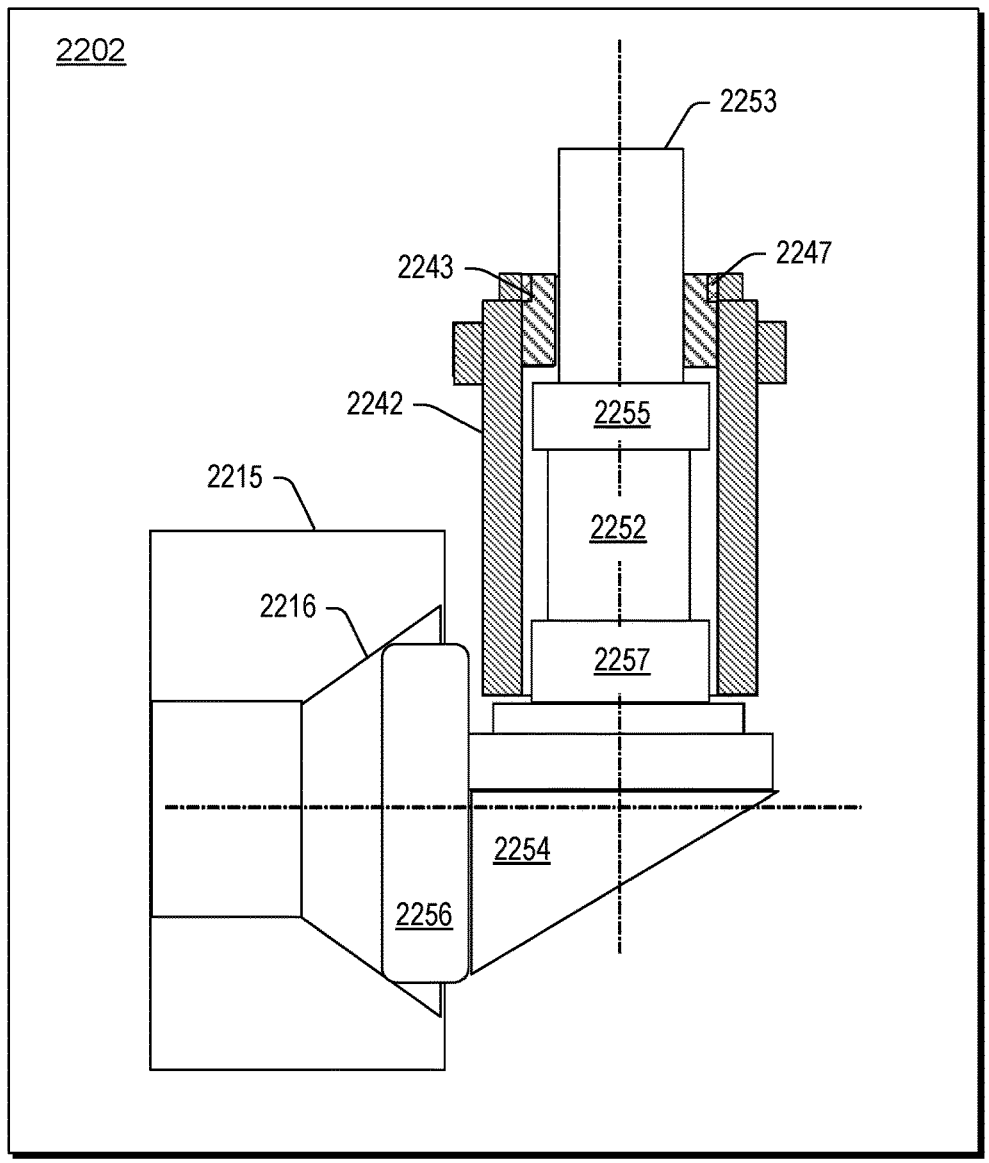
FIG. 24 is an approximate view of an example of an assembly.
Figure 25:
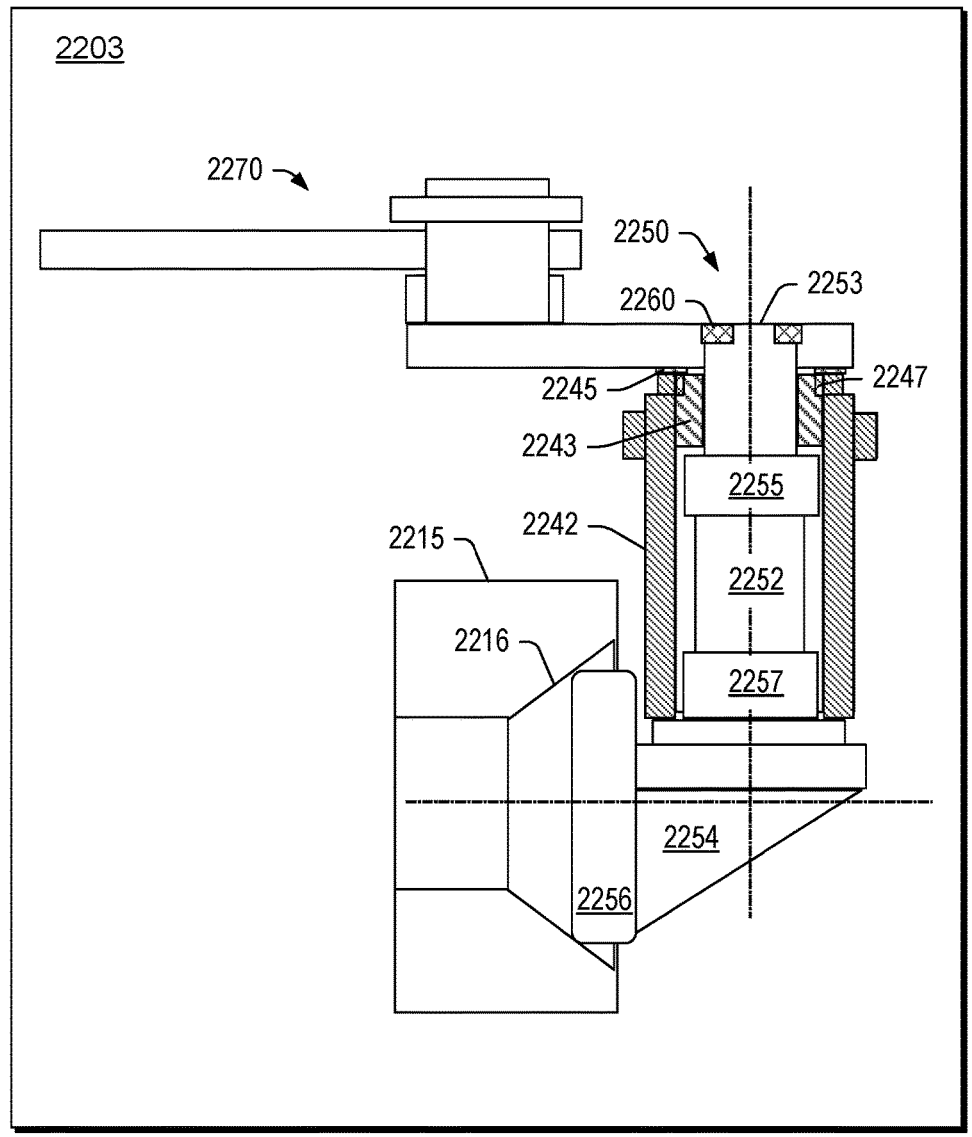
FIG. 25 is an approximate view of an example of an assembly.

FIGS. 23, 24 and 25 show various actions 2201, 2202 and 2203 associated with a method of assembling the assembly 2200 of FIG. 22.

FIG. 23 shows a portion of the assembly 2200 during an assembly process 2201 where the wastegate 2250 is positioned with respect to the wastegate seat 2216. In the example of FIG. 23, the shaft end 2253 can be inserted into a bore of the bushing 2242 where the bushing 2242 is positioned at least in part in a bore of the housing 2215 (see, e.g., FIG. 6). As an example, a tool, a jig, etc. may be utilized to apply force to the plug 2256 with respect to the wastegate seat 2216 such that the plug 2256 self-centers with respect to the wastegate seat 2216. For example, a plug with a convex toroidal surface can center in a wastegate seat with a conical surface where a line of contact between the toroidal surface and the conical seat can be substantially a circle. In such an example, a center axis of the toroidal surface and a center axis of the conical seat can become aligned substantially co-axially (e.g., substantially along a common axis).

FIG. 24 shows a portion of the assembly 2200 during an assembly process 2202 where the wastegate 2250 is positioned with respect to the wastegate seat 2216 and where the ring 2243 is welded via the ring weld 2247 to the bushing 2242. In such an operation, the axial position of the ring 2243 is fixed with respect to the bushing 2242. As shown, an end of the ring 2243 faces the journal 2255. In such an example, a clearance can exist between the end of the ring 2243 and a surface of the journal 2255.

As an example, a ring can be inserted about a portion of a shaft of a wastegate and at least in part into a bore of a bushing through which the shaft passes and extends a distance axially outwardly therefrom. In such an example, the where the ring may be adjusted to be at an optimal position (e.g., axially) with respect to the bushing and the ring may be adjusted to be at an optimal position with respect to a journal of the shaft, which may be defined via a clearance of the order of about 1 mm or less (e.g., consider a clearance of about 0.5 mm or less). The optimal positions may be maintained and welding performed to weld the ring to the bushing to form a ring weld.

As an example, a ring weld may be a spotted weld, a segmented weld, a continuous weld, etc. between a ring and a bushing. For example, a ring weld can include three segments where each segment spans an arc angle of about 30 degrees. In such an example, three 30 degree arc segments may be formed to connect the ring to the bushing. In such an example, welding can be performed via welding equipment, which may optionally include laser welding or another form of welding.

As an example, a method can include laser welding of a ring to a bushing such that one or more welds are formed that connect the ring to the bushing and, for example, such a method can include using a shim to adjust or set a clearance with respect a control arm (see, e.g., CL1). In such an example, the shim may contact a bushing and/or a ring and contact a control arm to define the clearance. As an example, a shim can be made of a sheet metal or another type of material.

FIG. 25 shows a portion of the assembly 2200 during an assembly process 2203 where the wastegate 2250 is positioned with respect to the wastegate seat 2216 and where the ring 2243 is welded via the ring weld 2247 to the bushing 2242 and where the control arm 2244 is welded via the weld 2260 to the shaft 2252 of the wastegate 2250 while the shim 2245 is positioned between a surface of the control arm 2244 and a surface of the bushing 2242 and/or a surface of the ring 2243, which can include a surface of the ring weld 2247. In such an example, the shim 2245 can act as a temporary axial spacer and may act to achieve perpendicularity between the control arm 2244 and the shaft 2252 (e.g., a rotational axis of the shaft 2252).

As an example, a shim may be shaped as a substantially planar component that includes substantially parallel sides that may be disposed adjacent to a shaft of a wastegate where a control arm may include a substantially planar surface that can contact one of the sides of the shim such that the control arm becomes level with the shim. In such an example, the rotational axis of the shaft can be substantially normal to the substantially planar surface of the control arm, which may be defined as a perpendicularity condition. For example, where a perpendicularity condition is met, as the control arm rotates in a plane, the shaft to which the control arm is connected rotates about a rotational axis (e.g., without wobble).

As an example, a method can include insert a shim about a portion of a shaft of a wastegate, positioning a control arm with respect to another portion of the shaft such that a surface of the control arm contacts the shim, securing an optimal position of the control arm with respect to the shaft (e.g., to achieve perpendicularity), securing an optimal position of the control arm with respect to an end of a bushing (e.g., consider a maximum clearance of about 0.05 mm), maintaining the optimal positions and welding the control arm to the shaft to form a weld between the control arm and the shaft. In such an example, the shim may be removed after forming the weld. As an example, the shim may provide for optimal positioning of two or more components.

As an example, the weld 2260 may be spotted, segmented, continuous, etc. As an example, of 360 degrees about the shaft 2252, the weld 2260 may be a total in a range from about 270 degrees to about 360 degrees (e.g., including 360 degrees). As an example, a series of spots may be welded over a total range of about 360 degrees. As an example, a continuous weld may be welded over a total range of about 360 degrees.

Referring again to the blocks of FIG. 11, which pertain to the example assemblies 1200, 1500, 1800 and 2200, various descriptions given above with respect to FIGS. 12 to 25 may be applicable to one or more of the example assemblies. For example, the assemblies 1500 and 2200 can be assembled using actions or operations that include a shim and, for example, the assemblies 1800 and 2200 can include a ring where, for example, the ring can be welded to a bushing via a ring weld. In the examples of FIGS. 12 to 25, the bushings 1242, 1542, 1842 and 2242 can be disposed in a bore of a housing, for example, consider a bore of a housing as illustrated in FIG. 6 (see, e.g., the housing 615) and/or as illustrated in FIGS. 2 and 3 (see, e.g., the housing 210 and the bore 212). As an example, the control linkages 1270, 1570, 1870 and 2270 may include one or more features of the assembly 400 of FIG. 4 (see, e.g., the control arm 444 and components operatively coupled thereto).

As an example, the wastegates 1250, 1550, 1850 and 2250 of the examples of FIGS. 12 to 25 may be a wastegate such as, for example, the wastegate 250 of FIGS. 2 and 3. For example, one or more of the wastegates 1250, 1550, 1850 and 2250 may be unitary integral wastegates (e.g., monoblock wastegates).

Figure 26:
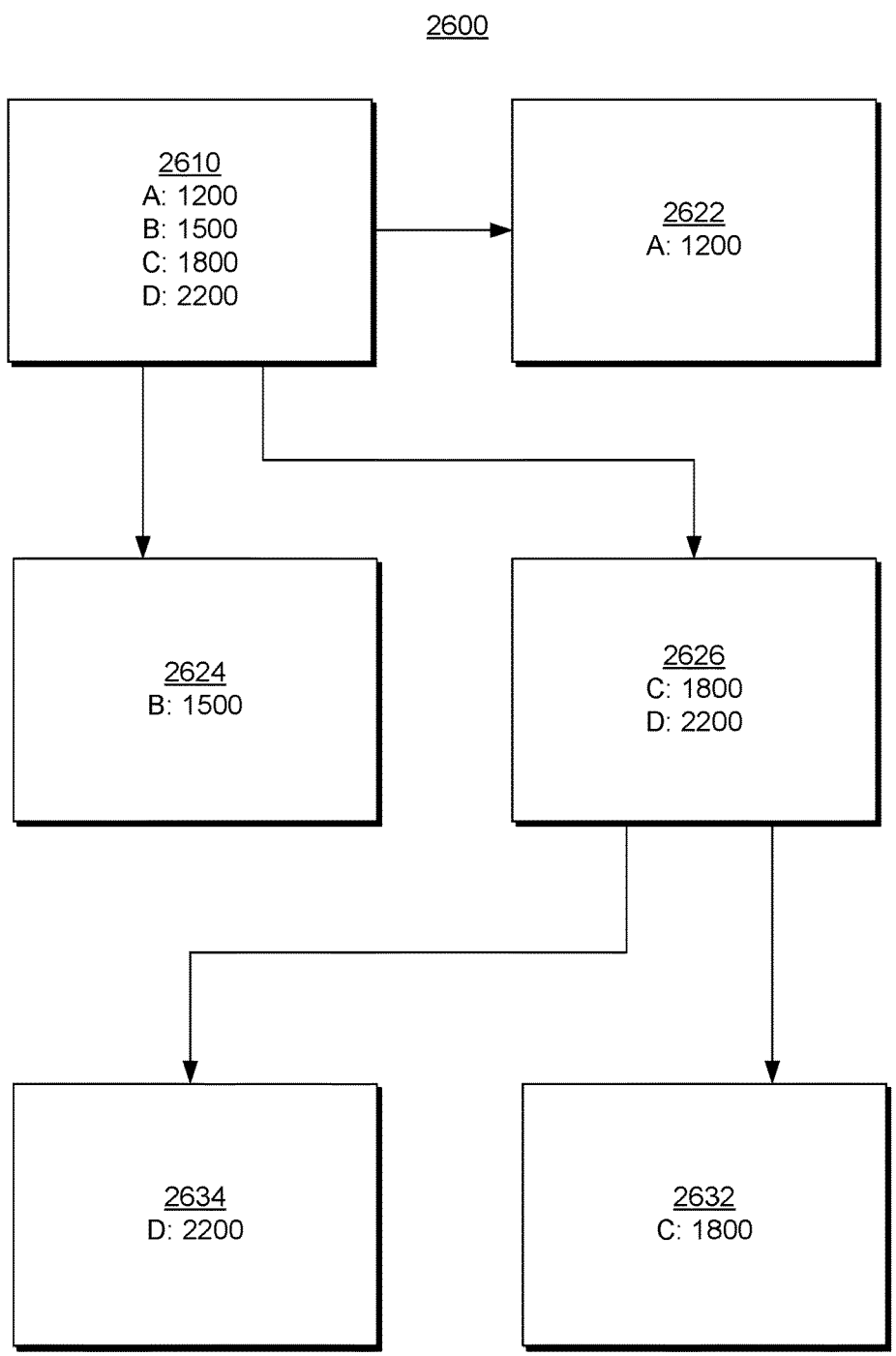
FIG. 26 is a block diagram of examples of methods.

FIG. 26 shows examples of methods 2600 where various blocks correspond a method of assembly of an assembly such as the assembly 1200 (see, e.g., blocks 2610 and 2622), where various blocks correspond a method of assembly of an assembly such as the assembly 1500 (see, e.g., blocks 2610 and 2624), where various blocks correspond a method of assembly of an assembly such as the assembly 1800 (see, e.g., blocks 2610, 2626 and 2632), and where various blocks correspond a method of assembly of an assembly such as the assembly 2200 (see, e.g., blocks 2610, 2626 and 2634).

As to a method according to the blocks 2610 and 2622, the block 2610 can include inserting a monoblock wastegate into a bushing, securing a centered position of the monoblock wastegate to a wastegate seat (e.g., a valve seat) and an arm of the monoblock wastegate to the bushing, blocking and holding the monoblock wastegate in the centered position; and the block 2622 can include insert a control arm onto the monoblock wastegate, securing an optimal position of the control arm to the monoblock wastegate, secure an optimal position of the control arm to the bushing (e.g., with a maximum axial clearance of approximately 0.1 mm), holding and maintaining the optimal control arm position to the monoblock wastegate and clearance of control arm to the bushing before and during welding, and welding the positioned control arm to the monoblock wastegate to form a weld at a joint, for example, with fusion between the control arm and the monoblock wastegate (e.g., with a penetration of the weld to a dimension of approximately 0.5 mm).

As to a method according to the blocks 2610 and 2624, the block 2624 can include inserting a shim about a portion of the shaft of the monoblock wastegate, positioning the control arm onto the shaft in contact with the shim, securing an optimal position of the control arm to the monoblock wastegate, securing an optimal position of the control arm with respect to the bushing (e.g., consider a maximum clearance of approximately 0.1 mm), holding and maintain the optimal control arm position to the monoblock wastegate before and during welding, welding the positioned control arm to the monoblock wastegate to form a weld at a join, for example, with fusion between the control arm and the monoblock wastegate (e.g., consider a weld with an arc span of about 270 degrees to about 360 degrees), and removing the shim.

As to a method according to the blocks 2610, 2626 and 2632, the block 2626 can include inserting a ring onto a portion of the shaft of the monoblock wastegate, securing an optimal position of the ring with respect to the bushing, securing an optimal position of the ring with respect to the monoblock wastegate (e.g., to a journal of the shaft of the monoblock wastegate with a maximum clearance of approximately 0.05 mm), holding and maintaining the optimal position of the ring to the bushing and to the monoblock wastegate before and during welding and welding the inserted ring to the bushing, for example, to form a weld at a joint between the ring and the bushing (e.g., consider a weld with multiple arc segments that span a number of degrees such as three arc segments that each span a number of degrees in a range from about 30 degrees to about 90 degrees); and the block 2632 can include inserting the control arm onto the shaft of the monoblock wastegate, securing an optimal position of the control arm to the monoblock wastegate, securing an optimal position of the control arm to the bushing (e.g., consider a maximum axial clearance of approximately 0.05 mm), holding and maintaining the optimal position of the control arm to the monoblock wastegate and to the bushing before and during welding and welding the positioned control arm to the monoblock wastegate (e.g., consider a weld with a total arc span of about 270 degrees to about 360 degrees).

As to a method according to the blocks 2610, 2626 and 2634, the block 2634 can include inserting a shim onto a portion of the shaft of the monoblock wastegate, positioning a control arm with respect to the shaft of the monoblock wastegate and the shim, securing an optimal position of the control arm to the monoblock wastegate, securing an optimal position of the control arm to the bushing (e.g., consider a maximum axial clearance of about 0.05 mm), holding and maintaining the optimal position of the control arm to the monoblock wastegate and to the bushing before and during welding, welding the positioned control arm to the monoblock wastegate (e.g., forming a weld with a total arc span of about 270 degrees to about 360 degrees), and removing the shim.

As an example, a method can include welding a ring to a bushing for a shaft and welding a control arm to the shaft. Such a method can include a monoblock shaft, arm and plug or a monoblock arm and plug fixed to the shaft. As an example, the plug can include a surface that is a portion of a torus and a wastegate seat can include a surface that is a portion of a cone. In such an example, the plug can contact the wastegate seat where the plug may be substantially centered with respect to the wastegate seat via application of force (e.g., to align an axis of the plug with an axis of the wastegate seat). In such an example, the shaft can be disposed in a bushing that is disposed in a bore of a turbine housing where a spacer may be utilized to position the shaft with respect to a ring that is received at least in part by the bushing. Such a spacer may be utilized to arrange set components during fixation of the ring to the bushing, which may be, for example, fixation by welding and/or one or more other processes. In such an example, a shim (e.g., a planar shim) may be utilized to achieve a clearance between a control arm and the ring and/or the bushing where the control arm may be fixed to the shaft, which may be, for example, fixation by welding and/or one or more other processes.

As an example, a turbine housing assembly can include a turbine housing that includes an exterior surface, an interior surface that includes a wastegate seat, and a bore that extends between the interior surface and the exterior surface; a bushing disposed at least partially in the bore where the bushing includes bushing bore; a wastegate that includes a shaft that extends through the bushing bore to a shaft end, a shaft shoulder disposed in the bushing bore, a plug, and an arm disposed between the shaft and the plug; a ring fixedly disposed at least in part in the bushing bore between the shaft shoulder and the shaft end; and a control arm connected to the shaft proximate to the shaft end to define an axial distance between a surface of the control arm and the shaft shoulder where the ring includes an axial length that is less than the axial distance. In such an example, the turbine housing assembly can include a ring weld that fixes the ring to the bushing. In such an example, the ring weld may be a tack weld that tacks the ring to the bushing at a particular axial position. In such an example, the ring weld can axially fix at least a portion of the ring. As an example, the ring weld may prevent rotation of the ring, for example, at the ring weld. As an example, a ring weld can connect a bushing and a ring via one or more materials (e.g., welded materials, optionally including solder, etc.). As an example, a weld may melt a portion of a ring and/or a portion of a bushing. As an example, a weld may be effectuated by a material such as a solder that forms a ring weld that connects a bushing and a ring.

As an example, a wastegate can be a component or sub-assembly that includes a shaft, an arm and a plug. As an example, an arm and a plug can be a unitary component, for example, cast as a single piece of material and referred to as a monoblock. As an example, a shaft, an arm and a plug can be a unitary component, for example, cast as a single piece of material and referred to as a monoblock. As an example, a monoblock wastegate can include a monoblock arm and plug where a shaft is fixed to the monoblock arm and plug. As an example, a monoblock wastegate can include a monoblock shaft, arm and plug.

As an example, a turbine housing assembly can include a shaft that includes a shaft shoulder and a journal where a shaft shoulder is a shaft journal shoulder. As an example, a shaft can include two journals.

As an example, a turbine housing assembly can include a wastegate seat that includes a conical surface. As an example, a turbine housing assembly can include a plug that includes a convex toroidal surface. For example, consider a toroid in a cone where the toroid may be in a position where an axis of the toroid and an axis of the cone substantially align. Such a state may be a low potential energy state that is a seated state. In such an example, where the toroid is a part of a plug and the cone is a part of a wastegate seat, the plug may be in a closed state with respect to the wastegate seat (e.g., to seal a wastegate passage that is in fluid communication with an opening within a perimeter defined by the wastegate seat.

As an example, a turbine housing assembly can include a control arm where the control arm is welded to a shaft. In such an example, movement of the control arm can move the shaft. For example, where the control arm pivots about an axis that corresponds to a longitudinal axis of the shaft, the shaft can rotate. As an example, where the control arm translates and/or tilts, such translation and/or tilting may be limited at least in part by, for example, a ring disposed at least in part in a bushing where the shaft passes through a through bore of the bushing.

As an example, in a turbine housing assembly, a control arm can be connected to a shaft proximate to a shaft end to define an axial distance between a surface of a control arm and a shaft shoulder where a ring includes an axial length that is less than the axial distance. In such an example, a difference between the axial distance and the axial length can define an axial clearance. In such an example, the axial clearance can correspond to a shim dimension. For example, a shim may be defined by a shim thickness as a shim dimension. As an example, a turbine housing assembly can include a shim disposed between in a clearance defined by a difference between the aforementioned axial distance and the aforementioned axial length.

As an example, in a turbine housing assembly, a bushing can include a shoulder, where an exterior surface of a turbine housing of the turbine housing assembly includes a seat surface disposed about a bore and where the shoulder of the bushing is seated against the seat surface of the turbine housing. In such an example, the seat surface and the shoulder can axially locate the bushing in the bore of the turbine housing. In such an example, the bushing can be in part exterior to the turbine housing (e.g., in an air environment space) and in part interior to the turbine housing (e.g., in an exhaust gas environment space).

As an example, a turbine housing assembly can include a turbine housing that includes an exterior surface, an interior surface that includes a wastegate seat, and a bore that extends between the interior surface and the exterior surface; a bushing disposed at least partially in the bore where the bushing includes a bushing bore; a wastegate that includes a shaft that extends through the bushing bore to a shaft end, a shaft shoulder disposed in the bushing bore, a plug, and an arm disposed between the shaft and the plug; a mesh ring disposed at least in part in the bushing bore between the shaft shoulder and the shaft end; and a control arm connected to the shaft proximate to the shaft end to define an axial distance between a surface of the control arm and the shaft shoulder where the mesh ring includes an axial length that is less than the axial distance. In such an example, the axial length of the mesh ring may be an uncompressed axial length of the mesh ring. As an example, during operation, a surface of the shaft may contact a surface or surfaces of the mesh ring. In such an example, where the mesh ring is resilient, the mesh ring may deform. As an example, such deformation may be elastic and may be limited to an axial distance that is predetermined, for example, based at least in part on an amount of force that can be exerted by the shaft on the mesh ring during operation. As an example, a mesh ring may be selected that has one or more characteristics as may be determined by material of the mesh ring and/or manufacture of the mesh ring including, for example, shape of the mesh ring. As an example, a mesh ring may be formed via compaction of wire where the amount of compaction defines one or more properties of the mesh ring. For example, a more compacted mesh ring (e.g., as made of wire) may be less resilient or substantially not resilient compared to a less compacted mesh ring (e.g., as made of wire).

As an example, a ring of a turbine housing assembly can be a resilient ring and/or include a resilient portion that may be defined at least in part by a pre-determined uncompressed operational axial length and a predetermined compressed operational axial length.

As an example, a turbine housing assembly can include a solid metal or alloy ring and a mesh ring where the mesh ring is disposed interiorly to the solid metal or alloy ring. In such an example, the mesh ring may be a first ring and the solid ring may be a second ring. As an example, the solid ring may be welded to a bushing to thereby encase the mesh ring in the bushing. In such an example, the mesh ring may be resilient and absorb some amount of energy upon contact of the mesh ring by a portion of a shaft. As an example, such contact may be axial thrust contact or axial pressure contact. In such an example, the mesh ring may be designed to deform axially by a predetermined amount and may be elastic such that the mesh ring returns to an undeformed state when the contact abates.

As an example, a turbine housing assembly can include a bushing bore that includes a plurality of inner diameter. In such an example, the bushing bore can include a first inner diameter bore portion and a smaller, second inner diameter portion where a ring is disposed at least in part in the first inner diameter bore portion. In such an example, the ring may be fixedly disposed such that at least a portion of the ring does not move axially in the bushing bore. As an example, a weld or welds (e.g., a ring weld or ring welds) may fix at least a portion of a ring to a bushing.

As an example, a method can include positioning a bushing in a bore of a turbine housing; positioning a shaft of a wastegate in a bore of the bushing where the shaft includes a shaft shoulder and a shaft end; applying force to a plug of the wastegate to substantially center the plug with respect to a wastegate seat of the turbine housing; positioning a ring at least in part in the bore of the bushing and between the shaft shoulder and the shaft end; and fixing the ring to the bushing (e.g., via welding and/or another fixing mechanism). In such an example, the method can include fixing a control arm to the shaft (e.g., via welding and/or another fixing mechanism). As an example, the aforementioned method may include positioning a shim about the shaft between the bushing and a control arm. For example, such a method can include welding the control arm to the shaft and removing the shim. As an example, such a shim can be of a maximum thickness of approximately 0.1 mm or less as disposed axially between components (e.g., a control arm and a bushing).

As an example, a ring may be positioned within a bore of a bushing where an axial clearance exists between a control arm and an end of the bushing.

As an example, a ring may extend axially beyond an end of a bushing where an axial clearance exists between a control arm and an end of the ring.

As an example, a ring and a shaft shoulder can be two components that delimit axial translation of a wastegate (e.g., a monoblock wastegate).

As an example, a method can include welding a control arm to a shaft where the control arm can be a component that delimits axial translation of a wastegate (e.g., a monoblock wastegate). In such an example, a ring and a shaft shoulder can be two components that also delimit axial translation of the wastegate (e.g., a monoblock wastegate).

As an example, a shaft can include a shaft shoulder and a journal where the shaft shoulder is a shaft journal shoulder. For example, a journal may be an annular portion of a shaft that is at a larger diameter than another portion of the shaft. In such an example, the shaft may step from a smaller diameter to a larger, journal diameter where the step defines an axial face that can be a surface that can contact a ring that is disposed at least in part in a bore of a bushing through which the shaft extends. In such an example, the bore of the bushing can include one or more diameters. For example, such a bore can include a journal diameter that defines a journal contact surface that can contact the journal of the shaft and can include a ring diameter that defines a ring contact surface that contacts the ring. In such an example, the ring can be connected to the bushing, for example, by welding an interface between a surface of the ring and a surface of the bushing that is defined by the ring diameter of a portion of the bore of the bushing.

As an example, a shaft can include more than one journal. For example, consider a shaft that includes two journals and an intermediate portion disposed between the two journals.

As an example, a method can include positioning a bushing in a bore of a turbine housing; positioning a shaft of a wastegate in a bore of the bushing where the shaft includes a shaft shoulder and a shaft end; applying force to a plug of the wastegate to substantially center the plug with respect to a wastegate seat of the turbine housing; positioning a shim about the shaft between the bushing and a control arm; and welding the control arm to the shaft. In such an example, the method can include removing the shim. As an example, a shim may include a thickness of approximately 0.1 mm or less. For example, consider a maximum thickness of a portion of the shim that can be positioned about the shaft between the bushing and the control arm. As an example, in the foregoing method, the wastegate may be a monoblock wastegate.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbine housing assembly comprising:
    a turbine housing that comprises an exterior surface, an interior surface that comprises a wastegate seat, and a bore that extends between the interior surface and the exterior surface;
    a bushing disposed at least partially in the bore wherein the bushing comprises a bushing bore and a ring portion of the bushing;
    a wastegate that comprises a shaft that extends through the bushing bore to a shaft end, a shaft shoulder disposed in the bushing bore, a plug, and an arm disposed between the shaft and the plug;
    a resilient mesh ring encased in the bushing bore between the shaft shoulder and the ring portion of the bushing that absorbs axial thrust energy associated with axial movement of the shaft; and
    a control arm connected to the shaft proximate to the shaft end to define an axial distance between a surface of the control arm and the shaft shoulder wherein the resilient mesh ring comprises an axial length that is less than the axial distance.

2. The turbine housing assembly of claim 1 comprising a ring weld that fixes the resilient mesh ring to the bushing.

3. The turbine housing assembly of claim 1 wherein the shaft comprises a journal and wherein the shaft shoulder comprises a shaft journal shoulder.

4. The turbine housing assembly of claim 3 wherein the shaft comprises two journals.

5. The turbine housing assembly of claim 1 wherein the wastegate seat comprises a conical surface.

6. The turbine housing assembly of claim 1 wherein the plug comprises a convex toroidal surface.

7. The turbine housing assembly of claim 1 wherein the control arm is welded to the shaft.

8. The turbine housing assembly of claim 1 wherein a difference between the axial distance and the axial length defines an axial clearance.

9. The turbine housing assembly of claim 8 wherein the axial clearance corresponds to a shim dimension.

10. The turbine housing assembly of claim 1 comprising a shim disposed in a clearance defined by a difference between the axial distance and the axial length.

11. The turbine housing assembly of claim 1 wherein the bushing comprises a shoulder, wherein the exterior surface of the turbine housing comprises a seat surface disposed about the bore and wherein the shoulder of the bushing is seated against the seat surface of the turbine housing.

12. The turbine housing assembly of claim 1 wherein the resilient mesh ring comprises a pre-determined uncompressed operational axial length and a predetermined compressed operational axial length.

13. The turbine housing assembly of claim 1 wherein the bushing bore comprises a plurality of inner diameter.

14. The turbine housing assembly of claim 1 wherein the resilient mesh ring comprises a metal wire mesh ring.

15. The turbine housing assembly of claim 1 wherein the ring portion of the bushing is formed by joining a ring to the bushing.

16. The turbine housing assembly of claim 1 wherein the ring portion of the bushing comprises a welded ring portion.

17. The turbine housing assembly of claim 1 wherein the arm of the wastegate comprises a shoulder that, responsive to axial thrust energy, abuts an end of the bushing to limit outward axial movement of the wastegate.

18. The turbine housing assembly of claim 17 wherein, where the shoulder of the arm abuts the end of the bushing due to axial thrust energy, the resilient mesh ring is compressed with paths therethrough altered that hinder outward flow of gas through the bore of the bushing.

* * * * *